United States Patent
Schuster et al.

(10) Patent No.: US 10,280,911 B2
(45) Date of Patent: May 7, 2019

(54) SOLAR FUELING STATION

(71) Applicant: Franklin Fueling Systems, Inc., Madison, WI (US)

(72) Inventors: Leon R. Schuster, Sun Prairie, WI (US); James M. Novak, Evansville, WI (US); Donald E. Watzke, McFarland, WI (US); William S. Nelson, Sun Prairie, WI (US)

(73) Assignee: Franklin Fueling Systems, LLC, Madison, WI (US)

( * ) Notice: Subject to any disclaimer, the term of this patent is extended or adjusted under 35 U.S.C. 154(b) by 243 days.

(21) Appl. No.: 15/282,501

(22) Filed: Sep. 30, 2016

(65) Prior Publication Data

US 2017/0096327 A1 Apr. 6, 2017

Related U.S. Application Data

(60) Provisional application No. 62/236,747, filed on Oct. 2, 2015, provisional application No. 62/316,911, filed on Apr. 1, 2016.

(51) Int. Cl.
*H02P 5/00* (2016.01)
*F04B 23/00* (2006.01)
(Continued)

(52) U.S. Cl.
CPC ............ *F04B 23/00* (2013.01); *F04B 17/006* (2013.01); *F04C 14/08* (2013.01); *H02P 6/04* (2013.01);
(Continued)

(58) Field of Classification Search
CPC .... H02P 5/00; F04B 49/20; F04B 2203/0209; F04D 27/004; F04D 15/0066; F04C 28/08; Y02B 30/745
See application file for complete search history.

(56) References Cited

U.S. PATENT DOCUMENTS 4,494,180 A 1/1985 Streater
4,573,115 A 2/1986 Halgrimson
(Continued)

FOREIGN PATENT DOCUMENTS

EP 2082931 7/2009
IN 04112MU2013 1/2014
(Continued)

OTHER PUBLICATIONS

International Search Report and Written Opinion, issued by the International Searching Authority, for related International Patent Application No. PCT/US2016/54894; 15 pages.

(Continued)

*Primary Examiner* — Patrick Hamo
(74) *Attorney, Agent, or Firm* — Faegre Baker Daniels LLP

(57) ABSTRACT

A pumping system and a pumping method implemented with the pumping system. The pumping system comprises a solar panel performing a photovoltaic conversion based on an insolation level including a first insolation level and a second insolation level; a fuel reservoir containing a fuel in a liquid state; an electric motor; a pump rotatable by the electric motor to pump the fuel; and a first motor drive converting electrical energy supplied by the solar panel to drive the electric motor at a first speed when the insolation level is at the first insolation level and at a second speed, slower than the first speed, when the insolation level is at the second insolation level, thereby pumping the fuel at a first rate and a second rate, respectively.

28 Claims, 12 Drawing Sheets

(51) Int. Cl.
  *H02P 6/04*   (2016.01)
  *H02S 10/10*  (2014.01)
  *F04C 14/08*  (2006.01)
  *F04B 17/00*  (2006.01)
  *B67D 7/04*   (2010.01)
  *B67D 7/70*   (2010.01)

(52) U.S. Cl.
  CPC ............. *H02S 10/10* (2014.12); *B67D 7/04* (2013.01); *B67D 7/70* (2013.01); *F04B 2205/01* (2013.01)

(56) References Cited

U.S. PATENT DOCUMENTS

| | | | |
|---|---|---|---|
| 4,999,560 | A | 3/1991 | Morishima |
| 5,400,924 | A | 3/1995 | Brodie |
| 5,493,155 | A | 2/1996 | Okamoto |
| 5,596,501 | A | 1/1997 | Comer |
| 5,692,647 | A | 12/1997 | Brodie |
| 6,082,618 | A | 7/2000 | Brown |
| 6,275,403 | B1 | 8/2001 | McNulty |
| 6,543,492 | B1 | 4/2003 | Nagao |
| 6,583,523 | B1 | 6/2003 | Bhate |
| 6,768,285 | B2 | 7/2004 | James |
| 7,145,265 | B2 | 12/2006 | McNulty |
| 7,148,650 | B1 | 12/2006 | McNulty |
| 7,248,018 | B2 | 7/2007 | Sanders |
| 7,260,499 | B2 | 8/2007 | Watzke, Jr. |
| 7,557,292 | B2 | 7/2009 | Shingleton |
| 7,561,040 | B2 | 7/2009 | Reid |
| 7,612,283 | B2 | 11/2009 | Toyomura |
| 7,721,751 | B1 | 5/2010 | Perrien |
| 7,807,918 | B2 | 10/2010 | Shingleton |
| 7,888,587 | B2 | 2/2011 | Shingleton |
| 8,096,177 | B2 | 1/2012 | Burris |
| 8,171,786 | B2 | 5/2012 | Burris |
| 8,176,931 | B1 | 5/2012 | Cajiga |
| 8,294,286 | B2 | 10/2012 | Hunter |
| 8,573,242 | B2 | 11/2013 | Cajiga |
| 8,682,600 | B2 | 3/2014 | Genta |
| 8,872,651 | B2 | 10/2014 | Reid |
| 8,959,774 | B2 | 2/2015 | Cajiga |
| 8,963,481 | B2 | 2/2015 | Prosser |
| 9,005,571 | B2 | 4/2015 | Biniwale |
| 9,007,020 | B2 | 4/2015 | Prosser |
| 9,249,790 | B2 | 2/2016 | Kobryn |
| 2004/0187951 | A1 | 9/2004 | Barker |
| 2005/0103400 | A1 | 5/2005 | Eichelberger |
| 2005/0165511 | A1 | 7/2005 | Fairlie |
| 2005/0242109 | A1 | 11/2005 | Reed |
| 2006/0070871 | A1 | 4/2006 | Bushman |
| 2008/0164766 | A1 | 7/2008 | Adest |
| 2008/0217998 | A1 | 9/2008 | Parmley |
| 2009/0027001 | A1 | 1/2009 | Haines |
| 2009/0145130 | A1 | 6/2009 | Kaufman |
| 2009/0284240 | A1 | 11/2009 | Zhang |
| 2010/0000596 | A1 | 1/2010 | Mackler |
| 2010/0023162 | A1 | 1/2010 | Gresak |
| 2010/0051083 | A1 | 3/2010 | Boyk |
| 2010/0229915 | A1 | 9/2010 | Ledenev |
| 2010/0260624 | A1 | 10/2010 | Pollack |
| 2011/0288769 | A1 | 11/2011 | Gudat |
| 2012/0080071 | A1 | 4/2012 | Kimbriel |
| 2012/0083921 | A1 | 4/2012 | Dronen |
| 2012/0091730 | A1 | 4/2012 | Stuermer |
| 2012/0111386 | A1 | 5/2012 | Bell |
| 2012/0180905 | A1 | 7/2012 | Webb |
| 2012/0205004 | A1 | 8/2012 | Webb |
| 2012/0256490 | A1 | 10/2012 | Zheng |
| 2012/0317777 | A1 | 12/2012 | Cajiga |
| 2013/0299001 | A1 | 11/2013 | Gillette |
| 2014/0167661 | A1 | 6/2014 | Van Der Merwe |
| 2015/0013839 | A1 | 1/2015 | Cajiga |

FOREIGN PATENT DOCUMENTS

| | | |
|---|---|---|
| WO | WO/1996/029244 | 9/1996 |
| WO | WO/2006/061039 | 6/2006 |
| WO | WO/2007/049274 | 3/2007 |
| WO | WO/2009/120670 | 10/2009 |
| WO | WO/2010/008401 | 1/2010 |
| WO | WO/2011/051949 | 5/2011 |
| WO | WO/2012/099670 | 7/2012 |
| WO | WO/2012/103498 | 8/2012 |

OTHER PUBLICATIONS

Solar Panel for a Fuel Station. SolarPanelTalk.com, 2010; https://www.solarpaneltalk.com/forum/off-grid-solar/off-grid-solar-panel-systems/2527-solar-power-for-a-fuel-station; 5 pages.

Off-Grid Solar Powered 12 Volt Portable Oil and Fuel Transfer Extractor Pump with KVUSMC, published on Nov. 20, 2014; https://www.youtube.com/watch?=NmTpvD11Jr81.

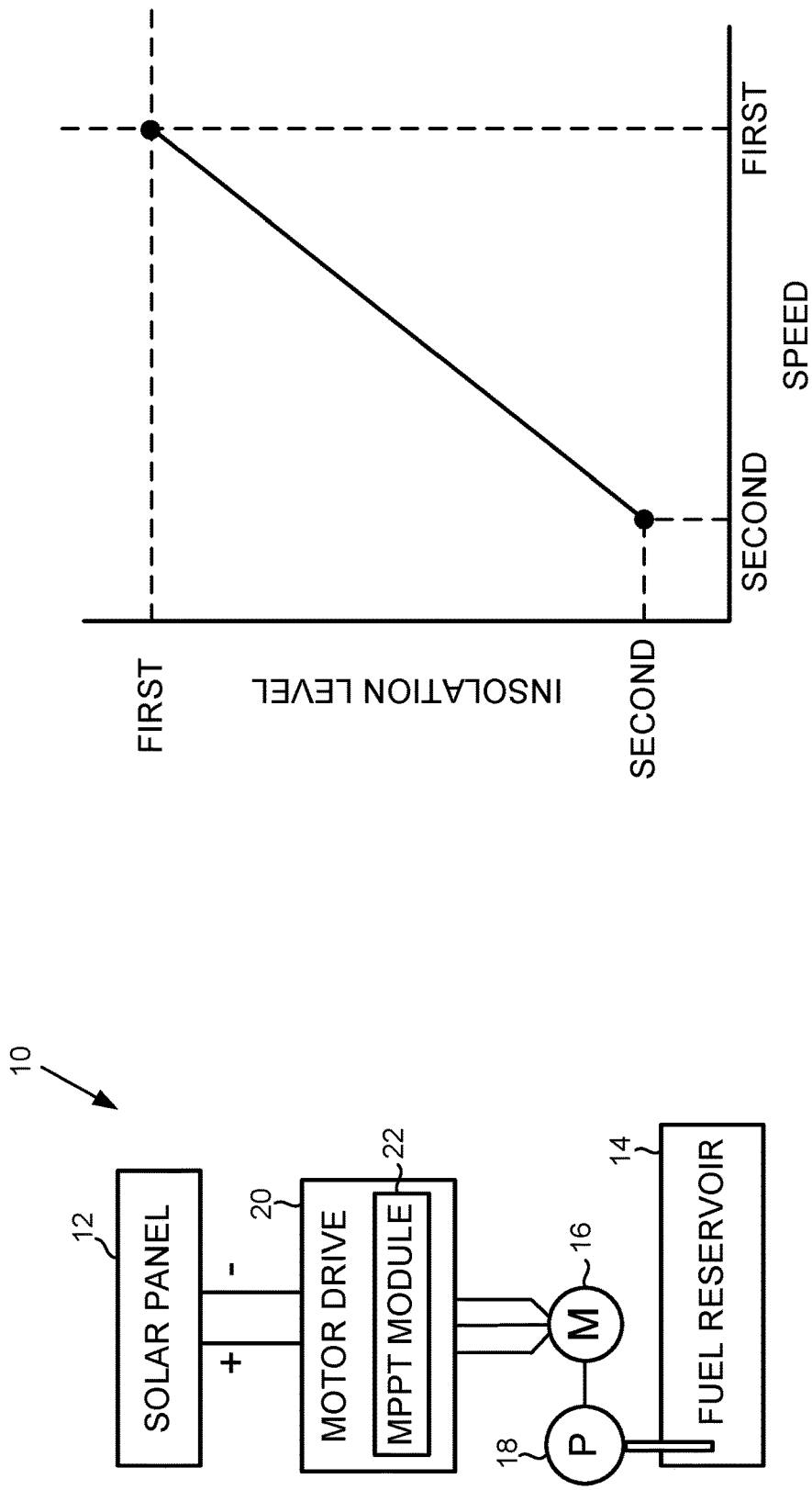

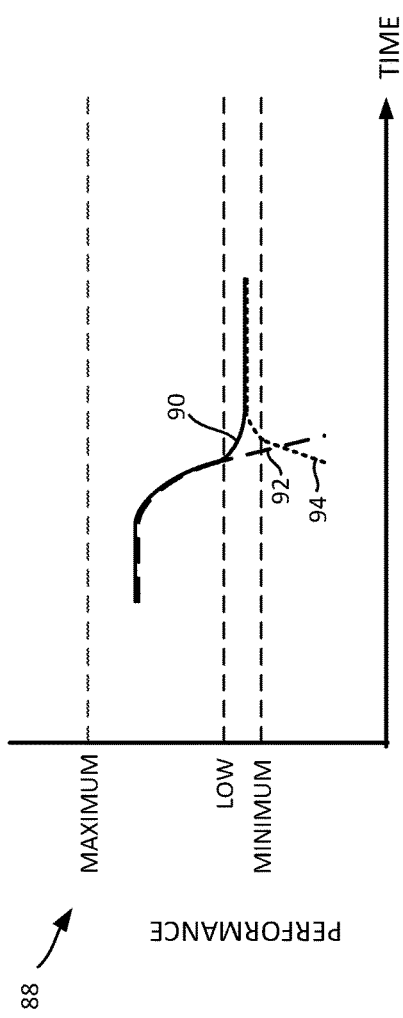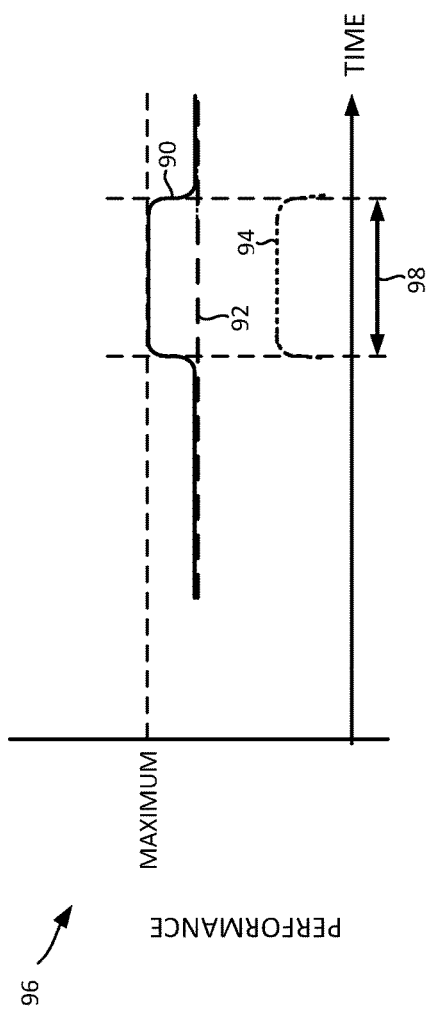

SOLAR FUELING STATION

CROSS-REFERENCE TO RELATED APPLICATIONS

This application claims the benefit of commonly owned U.S. Provisional Patent Application No. 62/316,911, filed Apr. 1, 2016, and U.S. Provisional Patent Application No. 62/236,747, filed Oct. 2, 2015; the disclosures of both provisional applications are incorporated herein in their entirety by reference.

FIELD OF THE DISCLOSURE

The disclosure relates generally to a system and a method for pumping fuel. More particularly, the disclosure relates to a system and method for powering a fuel pump with solar energy.

BACKGROUND OF THE DISCLOSURE

A fueling system includes pumps rotated by electric motors to pump fuel from a reservoir and dispense it through a nozzle. Some fueling systems are utilized in large cities with dense populations. These systems may comprise multiple dispensers and may rely on a stable power grid to power the motors and the dispensers. Often these systems are operated in "gas stations" that include restaurant facilities or kiosks where customers purchase food and novelty items such as medicaments, magazines and vehicle monitoring, repair and maintenance items. The kiosks may be air conditioned and the food items may be frozen. Thus, the energy requirements of these gas stations include energy for lighting and cooling in addition to fuel dispensing, and may include additional energy requirements due to services such as an air compressor station to inflate tires, water heating for shower services offered at truck stations, for example, and in connection with any other electric energy consuming device.

Fueling systems are also utilized in locations where population densities are sparse or where the power grid is not reliable. Gas stations in these locations may operate fuel powered electric generators to power the fueling systems and electric energy consuming devices when the power grid does not provide enough energy, e.g. during black-outs and brown-outs. In some countries, black-outs may last several hours during each day. Gas stations in these locations may also use solar systems including panels, inverters and batteries to supplement the energy supply and reduce reliance on fuel powered electric generators, for economic and environmental reasons. These solar systems typically produce alternating-current power by inverting the direct-current power produced by the solar panels, thus easily mating the solar system with the generator and the power grid via known power source switching systems. However, the lack of a stable electrical energy source can damage motor drives and reduce the life of the motor drives and the electric motors due to sudden and often frequent on and off switching of the electric power.

While known solar systems provide economic and environmental benefits, there is a need for fueling systems that improve the effectiveness of the known solar systems to capture and use more solar energy and use less of environmentally unfriendly energy sources, and also to provide a stable energy supply to extend the life of motor drives and electric motors driving the fuel pumps.

SUMMARY OF DISCLOSED EMBODIMENTS

Improved control systems for fueling stations, and methods of utilizing fueling stations with renewable energy sources, are provided herein. In some embodiments, the control systems include speed control to maximize photovoltaic conversion, and load shedding, including speed reduction and scheduling of leak detection. In some embodiments, techniques are provided for avoiding control contention between motor drives and inverters that draw energy from common solar panels. Renewable energy harvesting devices, generally, produce a variable amount of power that depends on the availability of natural energy, e.g. sun, wind, and water, and therefore systems using renewable energy harvesting devices can benefit from the features described herein.

Embodiments disclosed herein may increase the service availability of fueling stations and may also increase their reliability by stabilizing and enhancing the ability of motor drives to operate using renewable energy. As used herein, renewable energy includes solar, hydroelectric, and wind energy. Embodiments disclosed herein may provide economic and environmental benefits by reducing the amount of power needed to pump fuel using non-renewable energy sources to a greater extent than previously possible.

In one embodiment, a pumping system comprises a solar panel performing a photovoltaic conversion based on an insolation level including a first insolation level and a second insolation level; a fuel reservoir containing a fuel in a liquid state; an electric motor; a pump rotatable by the electric motor to pump the fuel; and a first motor drive converting electrical energy supplied by the solar panel to drive the electric motor at a first speed at the first insolation level and at a second speed, slower than the first speed, at the second insolation level, thereby pumping the fuel at a first rate and a second rate, respectively.

In another embodiment, a method of operating a pumping system comprises driving an electric motor at a first speed when an insolation level of a solar panel supplying energy for the electric motor is at or above a first insolation level; driving the electric motor at a second speed, lower than the first speed, when the insolation level is at a second insolation level; and pumping a fuel with a pump rotated by the electric motor at a first rate and a second rate corresponding, respectively, to the first speed and the second speed.

In a further embodiment, a pumping system comprises a solar panel performing a photovoltaic conversion based on an insolation level including a first insolation level and a second insolation level; a fuel dispenser; a fuel reservoir containing a fuel in a liquid state; a first pump-motor assembly comprising a first electric motor, a first pump rotatable by the first electric motor to pump the fuel, and a first motor drive, the first pump-motor assembly configured to receive electrical energy generated by the solar panel; a second pump-motor assembly comprising a second electric motor, a second pump rotatable by the second electric motor to pump the fuel, and a second motor drive, the second pump-motor assembly configured to receive electrical energy from a line source; a fuel manifold fluidly coupling the first pump, the second pump, and the fuel dispenser; and fueling control logic configured to operate the second pump-motor assembly and not the first pump-motor assembly when the insolation level is below the second insolation level and to operate the first pump-motor assembly when the insolation level is above the second insolation level.

There has thus been outlined, rather broadly, various features of the invention so that the detailed description thereof that follows may be better understood, and so that the present contribution to the art may be better appreciated.

Other features of the present invention will become clearer from the following detailed description taken with the accompanying claims.

DESCRIPTION OF THE DRAWINGS

FIG. 1 is a block diagram of an embodiment of a fueling system according with the invention and set forth in the disclosure;

FIG. 2 is a graph depicting a relationship between insolation level and pump speed and determined in accordance with an embodiment of a method of operation of the fueling system of FIG. 1;

FIGS. 7 and 8 are graphs depicting relationships between first and second motor drive assemblies cooperating to achieve desired system performance.

Figure 3:
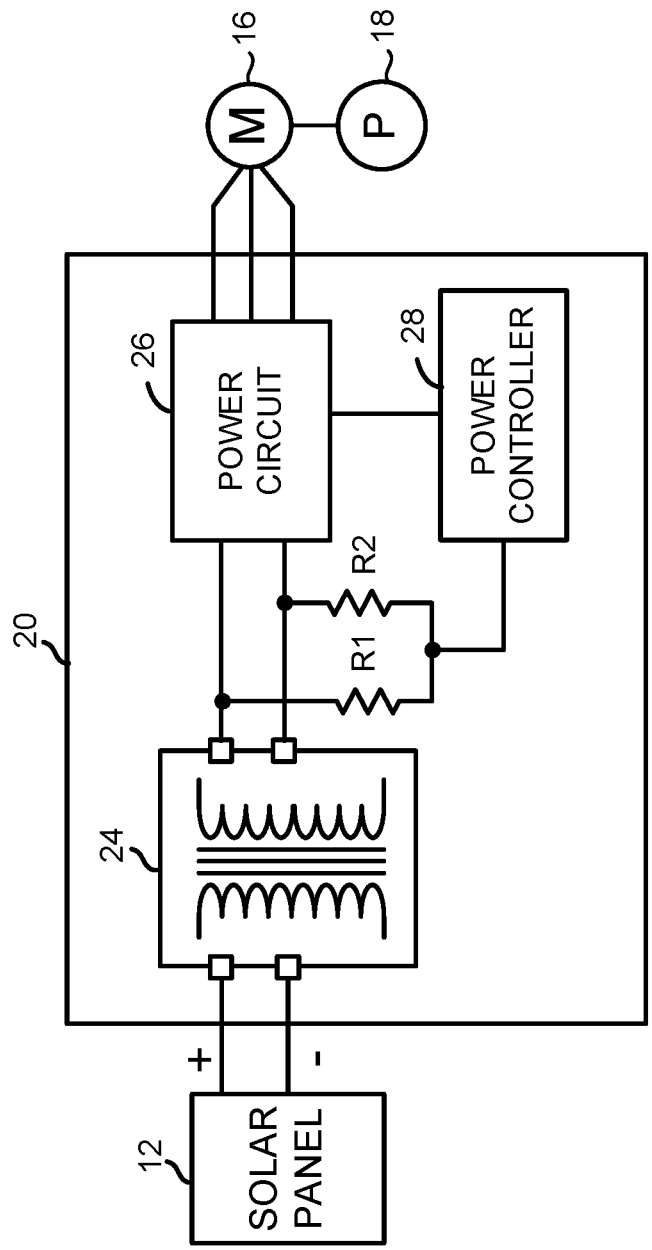
FIG. 3 is a schematic diagram of another embodiment of a fueling system according with the invention and set forth in the disclosure.

In the drawings, corresponding reference characters indicate corresponding parts, functions, and features throughout the several views. Although the drawings represent embodiments of various features and components according to the present invention, the drawings are not necessarily to scale and certain features may be exaggerated in order to better illustrate and explain the present invention. However, the invention is not limited to the precise arrangements and instrumentalities of the embodiments shown in the drawings.

DETAILED DESCRIPTION OF DISCLOSED EMBODIMENTS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention as set forth in the claims.

Except where a contrary intent is expressly stated, the terms "comprises," "comprising," "containing," and "having" and the like mean "includes," "including," and the like, and are generally interpreted to be open ended transition terms. The recitation of components, structures, steps, or the like specifically listed following an open ended transition term in no way limit such claim to the components, structures, steps, or the like specifically listed. The terms "consisting of" or "consists of" are closed transition terms.

Except where a contrary intent is expressly stated, the terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Except where a contrary intent is expressly stated, terms are used in their singular form for clarity and are intended to include their plural form.

Occurrences of the phrase "in one embodiment," or "in one aspect," herein do not necessarily all refer to the same embodiment or aspect.

FIG. 1 is a block diagram of a first embodiment of a pumping system, denoted by numeral 10, and FIG. 2 is a graph depicting a relationship between insolation level and pump speed. Fueling system 10 comprises a solar panel 12 performing a photovoltaic conversion based on an insolation level including a first insolation level and a second insolation level; a fuel reservoir 14 containing a fuel in a liquid state; an electric motor 16; a pump 18 rotatable by electric motor 16 to pump the fuel; and a motor drive 20 converting electrical energy supplied by solar panel 12 to drive electric motor 16 at a first speed at the first insolation level and at a second speed, slower than the first speed, at the second insolation level, thereby pumping the fuel at a first rate and a second rate, respectively.

Insolation refers to solar insolation and is a measure of solar radiation energy received by the solar panel in a given time, expressed as average irradiance in watts per square meter ($W/m^2$) or kilowatt-hours per square meter per day ($kW \cdot h/(m^2 \cdot day)$). A curve of the output current $I_{pv}$ versus open-circuit voltage $V_{OC}$ of the solar panel shows that at a given insolation level $I_{pv}$ is substantially constant as voltage increases, and then rapidly decays. At the knee of the curve the output power of the solar panel ($P = V_{pv} * I_{pv}$) is at a maximum. Thus, power generation can be maximized by maintaining $V_{pv}$ near the knee, which is at about 0.78 $V_{OC}$, referred to herein as $V_{MAX}$. It should be understood that $V_{MAX}$ varies as a function of insolation level.

Referring to FIG. 2, the first and second speeds are arbitrarily predetermined. The first speed may be a pump speed sufficient to pump fuel at a maximum permissible pressure. The pump and the solar panel may be sized to pump at the first speed during any desired amount of time. Obviously the longer the system is required to pump at the first speed the larger the solar panel will have to be in relation to the size of the pump. The second speed may be a speed sufficient to pump fuel at an acceptable rate. The first and second speeds also depend on the expected maximum insolation at the fueling location, whether the solar panel is arranged to track the position of the sun or stationary, and other factors that influence photovoltaic conversion. But regardless of the design parameters, the speed of pump 18, driven by electric motor 16, varies the electrical load on solar panel 12, and therefore changes the power output by solar panel 12. By matching speed to insolation level, fueling station 10 can be built with less capital investment than if fueling station 10 were built to always operate at the first speed, while also being capable of faster operation, on average, compared to a fueling station built to operate at only the second speed.

In some embodiments, the second insolation level is an insolation level sufficient for the first motor drive to drive the first electric motor at the lowest speed at which the motor is to be operated and not at a substantially higher speed. In some embodiments, the first insolation level is an insolation level sufficient for the first motor drive to drive the first electric motor at the highest speed at which the motor is to be operated. The highest speed at which the motor is to be operated may represent the speed that generates the highest desired fluid pressure, which may correspond to the highest safe fluid pressure. The lowest speed at which the motor is to be operated may represent the speed below which the motor ceases to perform as intended. For example, in a variable frequency drive the lowest speed at which the motor is to be operated may be the speed corresponding to about 30 hertz.

In one variation, fueling system 10 comprises a maximum power point (MPPT) module 22 configured to cause motor drive 20 to drive electric motor 16 at $V_{MAX}$ to maximize the photovoltaic conversion. In other words, MPPT module 22 causes operation at a power maximizing speed, to maintain the voltage of solar panel 12 near $V_{MAX}$. In one form thereof, MPPT module 22 is configured to sense a substantially open-circuit voltage of solar panel 12 when pumping is not required and to base $V_{MAX}$ on the substantially open-circuit voltage. If the first speed is configured to produce a maximum pressure, it should not be exceeded. However, at insolation levels between the first and second insolation levels, where the maximum pressure will not be exceeded, the speed can be regulated to operate at $V_{MAX}$, thus enabling fuel pumping at the fastest permissible rate for the available sunlight. Operation at the MPPT, particularly at low insolation levels, may extend operation of the fueling system on solar energy thus retard switching to alternative sources of energy.

FIG. 3 is a block diagram of a variation of fueling system 10 depicting a DC/DC converter 24 between solar panel 12 and a power circuit 26 of motor drive 20. DC/DC converter 24 may also be a separate component and not included with motor drive 20. A pair of sense resistors R1, R2 scale down the voltage output by DC/DC converter 24 to a control level sensed by a power controller 28, e.g. with an analog-to-digital-converter (ADC) circuit. Power controller 28 may comprise MPPT module 22 or MPPT module 22 may be provided separately. As shown, power controller 28 comprises MPPT module 22, sensing circuitry, and logic configured to command power circuit 26 to generate an alternating-current (AC) voltage suitable to power electric motor 16. The amplitude and frequency of the AC voltage determine the speed and pumping rate of pump 18. In one aspect thereof, DC/DC converter 24 comprises a step-up transformer to step up the voltage of solar panel 12 at a fixed ratio. The voltage sensed by the ADC circuit is thus a scaled version of the voltage of solar panel 12. DC/DC converter 24 may comprise a switching controller and a rectification circuit. The switching controller modulates a DC voltage provided to the DC/DC converter. The modulated voltage is provided to the primary winding of the transformer. The voltage on the secondary winding of the transformer is rectified and then output. The switching controller may have a variable duty-cycle configured to regulate the output voltage. An example DC/DC converter is shown in commonly owned U.S. patent application Ser. No. 14/187,206, filed on Feb. 21, 2014 (U.S. Publication No. 2014-0167661), which is incorporated herein by reference in its entirety.

Figure 4:
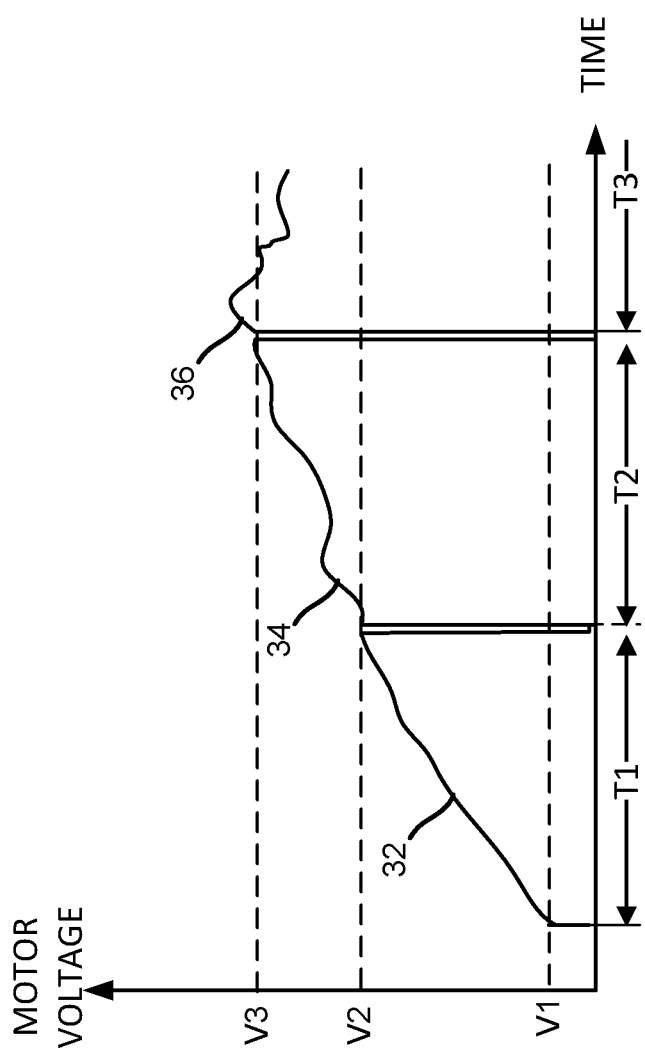
FIG. 4 is a graph depicting a relationship between motor voltage and time in accordance with embodiments of a method of operation of a fueling system according with the invention and set forth in the disclosure.

FIG. 4 is a graph depicting the voltage supplied to electric motor 16 if motor drive 20 is permitted to follow the sun unimpeded in accordance with one embodiment for controlling the pumping rate. A graph segment 32 depicts a motor voltage increase from V1 to V2 during a time period T1, a graph segment 34 depicts a motor voltage increase from V2 to V3 during a time period T2, and a graph segment 36 depicts fluctuation in the motor voltage during time T3, where T1=T2=T3. FIG. 4 also exemplifies a method of maximizing power, which may be implemented in MPPT module 22. The motor voltage is shown increasing during time T1 and then abruptly decreasing as a result of motor drive 20 being shut off to sense the open-circuit voltage (or the DC/DC converter scaled open-circuit voltage). The open-circuit voltage thus measured is substantially the same as the open-circuit voltage if the DC/DC converter and motor drive 20 were physically disconnected, but as used herein both voltages are referred to as open-circuit voltages. After sensing the open-circuit voltage, motor drive 20 is turned back on, and provides the motor voltage shown by graph segment 34. The process is repeated after time T2 and thereafter. In the present embodiment, motor drive 20 is turned off periodically in order to calculate $V_{MAX}$, thus $V_{MAX}$ as calculated in this embodiment is periodically updated. The accuracy of $V_{MAX}$ over time improves as the period between $V_{OC}$ measurements decreases. In other words, V1 approximates $V_{MAX}$ well, but the approximation degrades with the passage of time, reflecting changes in insolation level. The time between $V_{OC}$ measurements can be determined to prevent degradation exceeding a threshold. For example, in a further variation $V_{OC}$ is measured frequently (e.g. every minute) while pumping is not required, and is not measured once pumping starts. Of course, $V_{OC}$ can be measured more or less frequently, as desired. In a further variation, the speed of pump 18 is not increased once pumping starts, at the expense of maximum power extraction, to avoid confusing or concerning the user of the pump with pumping rate variations. Power controller 28 may be programmed to average $V_{OC}$ over time and determine if $V_{OC}$ is increasing or decreasing. If $V_{OC}$ is increasing, the speed can be held. If $V_{OC}$ is decreasing, a speed can be set that is slower than possible with the available power, and then maintained such that as the available power decreases the speed can be maintained.

In addition to the embodiments for maximizing power described above, MPPT module 22 may comprise any known maximum power point tracking logic. Examples of MPPT logic include perturb-and-observe logic, in which the voltage of the motor is perturbed and the effect of the perturbation on current is observed to determine whether the solar panel is operating on one side or the other of the power knee (i.e. a "hill climbing" method), and incremental conductance logic, in which the sign of $dI_{PV}/dV_{PV}$ is observed (e.g. another hill climbing method) to determine whether the solar panel is operating on one side or the other of the power knee. Once it is known which side of the power knee the solar panel is operating on, MPPT module 22 causes speed increases or decreases to maximize power extraction until the solar panel operates on the other side of the power knee, then the process repeats.

Figure 5:
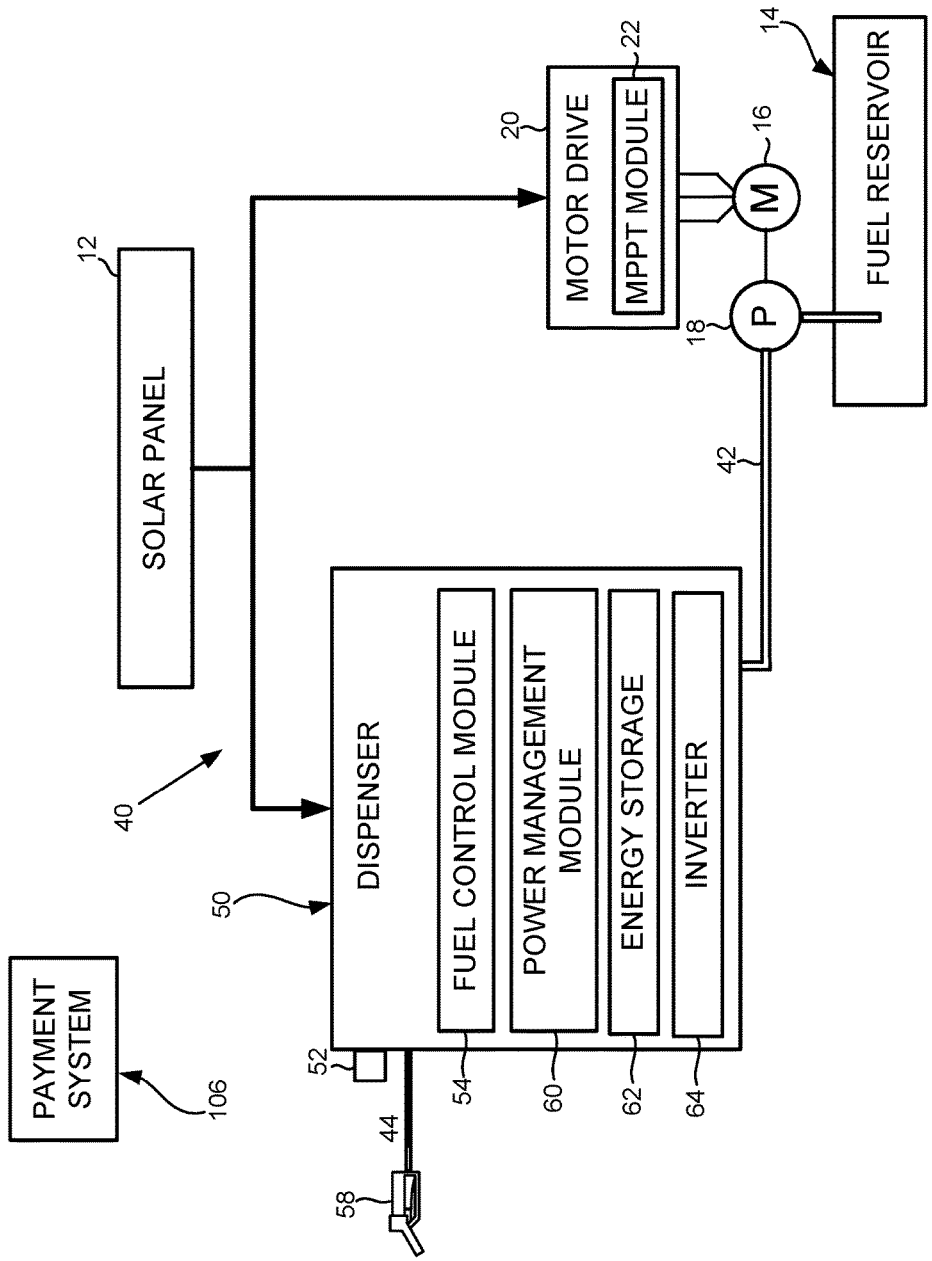
FIG. 5 is a schematic diagram of another embodiment of a fueling system according with the invention and set forth in the disclosure.

The first embodiment of the pumping system depicts a basic system that can be very cost effective, both operationally and in capital investment, but also limited in the sense that it does not include point-of-sale capabilities. FIG. 5 depicts in a block diagram a second embodiment of a pumping system, denoted by numeral 40, which is more versatile. Pumping system 40 comprises a dispenser 50 including a hook-switch 52, a fuel control module 54, a power management module 60, an energy storage 62 electrically coupled to power management module 60, and an inverter 64 also electrically coupled to power management module 60. FIG. 5 also shows a fueling line 42 coupled to pump 18 and a fueling line 44. Fueling line 44 is fluidly coupled to line 42 (coupling not shown). Power management module 60, energy storage 62, and inverter 64 may be positioned externally or separately from dispenser 50 and are provided to power fuel control module 54. Hook-switch 52 senses removal of a fueling nozzle (not shown) from its cradle and transmits a demand signal to fuel control module 54. A fueling nozzle 58 is coupled to fueling line 44. Responsive to the demand signal, fuel control module 54 enables fuel discharge through the nozzle. In one variation, fuel control module 54 maintains a predetermined pressure in fueling line 42 by controlling motor drive 20, and enables fuel discharge by activating a flow valve (not shown), which causes immediate discharge of fuel. In another variation, fuel control module 54 engages motor drive 20 responsive to the demand signal to pressurize fueling line 42. Fueling line 42 may comprise one-way check-valves to retain fuel in the line even when pump 18 is not pumping.

When pump 18 is not pumping, power management module 60 redirects energy generated by solar panel 12 to charge energy storage 62. In turn, energy storage 62 supplies DC power to power management module 60. If dispenser 50 comprises AC lights or other AC electrical loads, inverter 64 inverts the DC power to AC power to power the AC loads. Example energy storage comprises batteries and storage capacitors.

In a third embodiment, energy storage 62 is sized to power motor drive 20. When the insolation level is not sufficient to operate electric motor 16 at the first speed, power management module 60 may supplement the DC power supplied by solar panel 12 with energy from energy storage 62 to operate electric motor 16. In one variation, power management module 60 supplements solar power to, jointly, drive electric motor 16 at the first speed. In one example, power management module 60 supplements solar power by converting the voltage of the alternate supply source to DC, if necessary, and converting the amplitude of the DC voltage to a level matching the voltage output of the solar panel. The DC/DC conversion may be performed by controlling the duty-cycle of the DC/DC controller.

In another variation, power management module 60 connects energy storage 62 to drive electric motor 16 only when the insolation level is insufficient to operate electric motor 16 at least at the second speed. In an aspect of the present variation, power management module 60 comprises run-time extension logic configured to cause motor drive 20 to drive electric motor 16 at a run-time extending speed configured minimize energy storage discharge. The run-time extending speed may be a function of the state-of-charge (SOC) of energy storage 62. Thus, the speed of electric motor 16 may be higher at higher SOC and may taper as energy storage 62 is depleted of energy. Power management module 60 may comprise power management logic and switching units sufficient to connect and disconnect energy storage 62 from motor drive 20 and solar panel 12. Example switching units comprise relays, contactors, and solid-state switches. Power management module 60 may receive a fueling enable signal from fuel control module 54 and connect energy storage 62 to motor drive 62 based thereon. Fuel control module 54 may comprise fueling control logic configured to receive the demand signal and transmit the enable signal to power management module 60. Fuel control module 54 may also comprise point-of-sale (POS) logic configured to receive payment verification via a payment system 106, and responsive to said payment verification, commence fuel discharge. In one aspect, a user communicates with payment system 106 utilizing a mobile device, and payment system 106 transmits the payment verification to the POS logic. Payment system 106 may also transmit the authorized amount of fuel to be discharged by dispenser 50. In this manner dispenser 50 does not intermediate the POS transaction, it merely dispenses the amount of fuel authorized by payment system 106. The POS logic may comprise transmitting and receiving hardware to receive the payment verification from payment system 106 and, optionally, transmit to payment system 106 or the mobile device an amount of delivered fuel. Transmitting and receiving hardware comprises any known wireless transmitter, receiver and/or modem, including cellular and WiFi modems.

Power management modules and fuel control modules described herein may comprise logic to perform power management and fuel control functions. The term "logic" as used herein includes software and/or firmware executing on one or more processing devices, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. Logic may include pins to interface with various control lines and output lines. For example logic may comprise switching units, such as power transistors or relays, and the logic may actuate the switching units based on signals received at the input pins to generate desired voltages at output pins connected to output lines. Logic may also generate desired voltages at output pins connected to output lines based on signals received at the input pins, which may be analog or digital, and may comprise control and power voltage levels.

Figure 6:
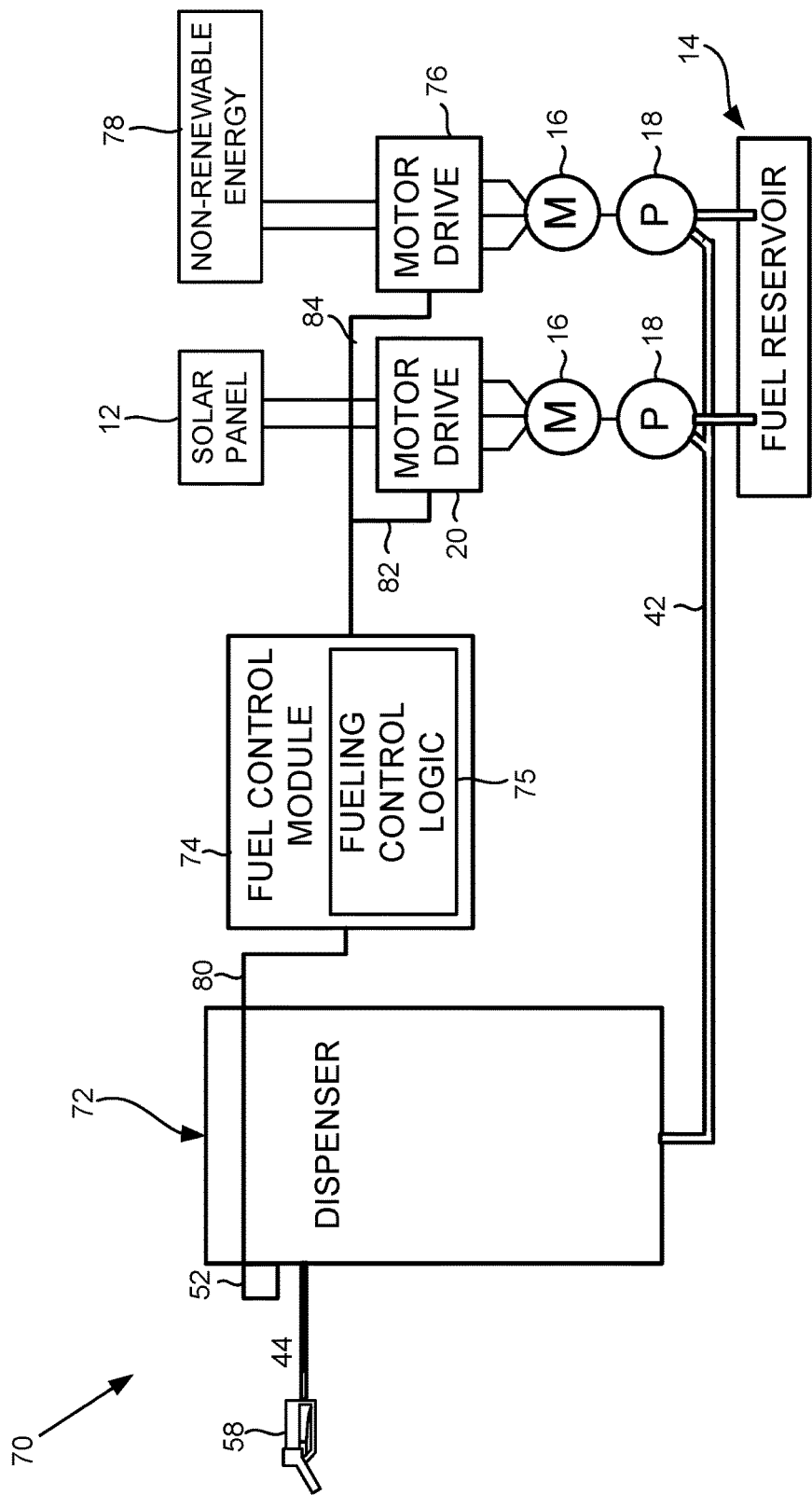
FIG. 6 is a schematic diagram of a further embodiment of a fueling system according with the invention and set forth in the disclosure.

FIG. 6 depicts in a schematic diagram another embodiment of a pumping system, denoted by numeral 70, comprising a dispenser 72 including a fuel control module 74, motor drive 20 electrically coupled to solar panel 12, a motor drive 76 electrically coupled to line power 78, a pair of motors 16, and a pair of pumps 18 fluidly coupled via a manifold to fueling line 42 which is fluidly coupled, as described previously, to fueling line 44 (coupling not shown). Dispenser 72 may include power management module 60 and energy storage 62, as described with reference to FIG. 5, or these components may be omitted or provided separately, as described with reference to FIG. 9. Dispenser 72 may be powered by solar panel 12 or line power 78. As used in the present embodiment line power comprises one or both of grid power and stored power, which may be coupled and controlled by power management module 60 to ensure the availability, within the capacity restrictions mentioned previously, of electrical energy.

Fuel control module 74 receives an off-hook signal from dispenser 72 via an off-hook line 80 and thereby senses removal of fueling nozzle 58 from the cradle of hook-switch 52 and determines that there is demand for fuel based thereon. Fuel control module 74 then enables fuel discharge through the nozzle by managing motor drives 20 and 76. Control lines 82 and 84 are provided to enable fuel control module 74 to communicate with motor drives 20 and 76. Herein, motor drive 20 may be referred to as the first motor drive or as the "solar powered drive" and motor drive 76 may be referred to as the second motor drive or as the "non-renewable energy powered drive". As used herein non-renewable energy powered drive refers to a motor drive powered by line power, an electric generator driven by a combustion engine, and any other electric energy source which is not renewable, even if the motor drive can also be, occasionally, powered by an energy storage charged by renewable energy harvesting devices. In one variation of the present embodiment, control module 74 comprises fueling control logic 75 configured to determine if the solar powered drive should operate, if the non-renewable energy powered drive should operate, if both drives should operate, and the speed at which each drive should operate to satisfy demand. Fuel control logic 75 may monitor power to determine whether to operate the first motor drive. Power monitoring may comprise receiving an indication of available power or insolation from power management module 60. Alternatively, power monitoring may comprise monitoring the input voltage of motor drive 20. Fuel control logic 75 can overlap operation of the motor drives to stabilize fuel pressure such that fuel dispenser 72 operates smoothly. Alternatively, the drives can be controlled to maintain a desired flow, which is related to pressure for a given fluid system. Fuel control logic 75 may comprise pressure or flow sensors, as desired.

In another example, fueling control logic 75 includes tables that correlate electrical power to flow or pressure. The tables can be determined experientially and are based on the Affinity laws and known characteristics of pumps 18. Generally, fueling control logic 75 monitors the power of the first motor drive and then activates the second motor drive when the power is insufficient to meet demand. In the present context, electrical power is monitored by monitoring voltage and current, and may comprise computing actual power based on the power factor therebetween. Voltage and current may be monitored by monitoring the current of the motor and relying on the known motor voltage generated by the motor drive, or by monitoring the DC link of the motor drive. An example method of power monitoring and activation of the second motor drive will now be described in detail. The first motor drive drives motor 16 when the off-hook switch 52 at dispenser 72 is actuated, sending the off-hook signal to fueling control logic 75 over off-hook line 80. The first motor drive samples the power drawn by motor 16. Fuel control logic 75 then determines whether the power drawn by motor 16, based on operation of pump 18, is sufficient to meet demand, and if not sufficient activates the second motor drive. The power is sufficient when it exceeds a predetermined power level. The predetermined power level may comprise multiple predetermined power levels if multiple dispensers are supplied fuel by fueling line 42, in which case fueling control logic 75 would receive multiple off-hook signals and determine demand based thereon. For example, the table may tabulate power levels relative to the number of off-hook signals, and control logic 75 then looks up the power level corresponding to a given number of off-hook signals to determine the power level to compare to the sampled power level. Fuel control logic 75 then monitors power consumption by the second motor 16 to determine when the second motor drive can be deactivated, based on the power consumption by the second motor 16 being less than a second power level. The second power level may comprise multiple predetermined power levels if multiple dispensers are supplied fuel by fueling line 42.

In another variation of the present embodiment, fueling control logic 75 is included in one of the first and second motor drives. In one example, fueling control logic 75 is included in the first motor drive and control line 84 interfaces directly fueling control logic 75 to the second motor drive. The first motor drive functions as a master or primary drive and the second motor drive functions as a slave or secondary drive. The off-hook signal is received by fueling control logic 75 over off-hook line 80, which connects off-hook switch 52 to the first motor drive. In another example, fueling control logic 75 is included in the second motor drive, and is configured to control operation of the first motor drive by monitoring the power of the first motor drive, to receive the off-hook signals, and to activate the second motor drive as described herein based on the power consumed by the first motor drive. The first motor drive comprises logic configured to communicate its power consumption to fueling control logic 75. The logic may comprise analog or digital voltage sensing circuits. Alternatively, the values of voltage, current, and or power may be transmitted via a communications link using a serial communications protocol such RS-485. The first and second motor drives and power monitoring module 60 may be located in a building such as an equipment room in the fuel station.

While the first and second motor drives have been described as having the capability to control the speed of motor 16, it should be understood that in some embodiments the first and/or the second motor drives may comprise controls configured to operate motor 16 at a single speed.

The first motor drive may be coupled to a first pump driven by a first motor. The second motor drive may be coupled to a second pump driven by a second motor. FIGS. 7 and 8 are graphs depicting relationships between the first and second motor drives cooperating in accordance with instructions from fueling control logic 75 to achieve desired system performance. The first and the second pumps are fluidly coupled to the fuel reservoir. The first and second pumps may draw fuel from the fuel reservoir and pump the fuel over a common fuel line to one or more dispensers, as described with reference to FIG. 6. The second motor drive is electrically coupled to a second power source, e.g. line power, comprising at least one of a power grid and an energy storage. The second motor drive is not directly powered by solar energy, therefore decreases in insolation level do not affect its operation. The second motor drive can be said to be insolation-independent, even though it may receive energy from the energy storage, which may store energy received from solar panels. In the present embodiment, fueling control logic 75 is configured to generate a first control signal to cause the first motor drive to drive the first motor; to detect a low performance level of the system, and responsive to the detection of the low performance level, to generate a second control signal to cause the second motor drive to drive the second motor. The first and second control signals may be transmitted over control lines 82 and 84 and may be generated by fuel control module 75 which is configured to monitor the power available from solar panel 12 or consumed by the first motor and, based thereon, determine if the first motor drive should operate, if the second motor drive should operate, if both drives should operate, and the speed at which each drive should operate to generate a desired system performance. Control module 74 may monitor other parameters in addition to, or instead of, power available from solar panel 12 to determine that the performance of the first motor drive is equal to or less than a low performance. Performance may be determined based on pressure, flow rate, insolation level, power (described above), and any other known characteristic of the fuel pumping system. Known flow or pressure sensors may be provided in the fuel line to monitor performance. Insolation level may be measured with a solar cell dedicated to that purpose or by monitoring the output of the solar panels or by monitoring the voltage of the first motor drive. Examples of performance monitoring by the fueling control logic 75 will be described below and with reference to FIGS. 7 and 8.

In one variation, the solar powered drive (in this example, e.g. the first motor drive) is operated alone by control module 74 until fuel pressure reaches a low predetermined level, at which time the non-renewable energy powered drive (in this example, e.g. the second motor drive) is engaged by control module 74 to supplement the pumping capacity and increase the fuel pressure. As the solar powered drive continues to reduce its speed and pumping level due to decreased solar energy, fueling control logic 75 increases the speed of the non-renewable energy powered drive and eventually shuts down the solar powered drive if the solar energy is insufficient to operate it. If fueling control logic 75 determines that solar energy is available again, fueling control logic 75 will reduce the speed of the non-renewable energy powered drive and increase the speed of the solar powered drive. In one example, fueling control logic 75 monitors the fuel pressure and supplements the pumping rate of the solar powered line with the line power drive to maintain a minimum line pressure. In another example, fueling control logic 75 comprises pumping rate tables based on solar power availability and supplements the pumping rate of the solar powered drive with the non-renewable energy powered drive based on the available solar power and correlated motor drive speeds. The present variation is illustrated in graphical form in FIG. 7, wherein a graph 88 depicts performance curves 90, 92, and 94 corresponding, respectively, to the system performance, the first motor drive performance, and the second motor drive performance. The vertical axis shows minimum, low, and maximum performance levels. For the first motor drive, the minimum performance is achieved at the second insolation level, described with reference to FIG. 2. The low performance level is a level achievable by the first motor drive and is predetermined to ensure that the second motor drive can begin pumping before the first motor drive reaches the minimum performance level, thus allowing the fueling control logic 75 to control the speeds of both motor drives to smooth the transition or the supplementation of fuel due to pumping by the second motor drive. In one example, the fueling control logic 75 is further configured to detect a third insolation level, between the first and second insolation levels, which is correlated to the low performance level of the system. In this example, when the third insolation level is reached (as the insolation level decreases), the fueling control logic 75 starts the second motor drive.

The maximum performance level is a system performance level predetermined for the pumping system and can be equal to or less than the system performance when both pumps are pumping at their maximum capacities. Graph 88 shows that the performance of the first motor drive is decreasing over time. When the performance of the first motor drive reaches the low performance level, the second motor drive starts operating. Then the performance of the first motor drive reaches the minimum level, and thereafter, all the pumping is due to the operation of the second motor drive. The same cooperation between the drives may take place in reverse order as the insolation level rises (not shown), to pump using solar energy instead of energy from non-renewable sources. As used in the present embodiment, solar power refers to the instantaneous power that can be generated by a solar panel at the present insolation level for a given motor speed. The motor speed affects the power that can be extracted from the solar panel, as described previously. The given motor speed is the speed necessary to generate the desired pressure. The fueling control logic 75 may communicate the target speeds to the drives via control lines 82 and 84. The solar powered drive may communicate the available solar energy (e.g. the power drawn while operating at the maximum power point) over control line 82 to enable the fueling control logic 75 to determine the target speeds. Alternatively, the fueling control logic 75, or a portion thereof, can be provided in the first and/or the second motor drives or configured to operate in a distributed manner.

In a further variation of the present embodiment, the solar powered drive may communicate the available solar energy or operating speed (which depends on solar energy) to fueling control logic 75 in the non-renewable energy powered drive and operate to maximize use of the solar energy (e.g. as an independent or master drive), and fueling control logic 75 in the non-renewable energy powered drive may determine the speed of the non-renewable energy powered drive based on the communicated information (e.g. operate as a supplemental or slave drive).

In some embodiments, fueling control logic 75 comprises a schedule of peak operating hours for the fueling station and is configured to ensure that either the non-renewable energy powered drive or a combination of the non-renewable energy powered drive and the solar powered drive operate to ensure maximum system performance during the peak operating hours. During off-peak hours the flow rate and throughput can be sacrificed to save energy from non-renewable sources. The foregoing example will now be described with reference to graph 96 in FIG. 8, which shows that the performance of the first motor drive is below the maximum system performance as a peak operating hours period 98 approaches. At the beginning of period 98 or shortly before (to account for mass and inertia) the second motor drive begins to operate to raise the system performance to the maximum level. The second motor drive then slows down and stops near the end of period 98. In this manner the non-renewable energy powered drive supplements pumping when the solar powered drive is unable to sustain the desired maximum system performance. In one example, the first motor drive is sized below a capacity necessary to achieve the maximum system performance with one motor drive alone. The schedule can comprise the starting and ending times of the peak hours operating period and can be stored in a table of the system, for example in the fuel control module. The fuel control module may comprise control logic (e.g. fueling control logic 75) configured to implement the examples described with reference to FIGS. 7 and 8, by establishing energy saving and maximum performance operating modes, operating in the energy saving mode (described with reference to FIG. 7) at all times except during the peak hours period, and operating in the maximum performance operating mode during the peak hours period. In one example, the control logic is further configured to detect a fourth insolation level and to operate the second motor drive at a maximum speed responsive to the insolation level being equal to or below the fourth insolation level. The fourth insolation level is a level at which the first motor drive can operate to generate, together with operation of the second motor drive at maximum speed, the maximum performance level of the system. This example may find utility when the insolation level is near the fourth insolation level before the peak hours period, to start the second motor drive sooner or at a faster ramp rate than if the insolation level was above the fourth insolation level. More generally, the ramp rate of the second motor drive can be based on the difference between the fourth insolation level and the first insolation level. As used herein, the maximum speed is the highest speed at which it is desired to operate the motor rather than the maximum speed at which the motor could be operated. The highest speed may correspond to a nameplate high speed of the motor.

Figure 9:
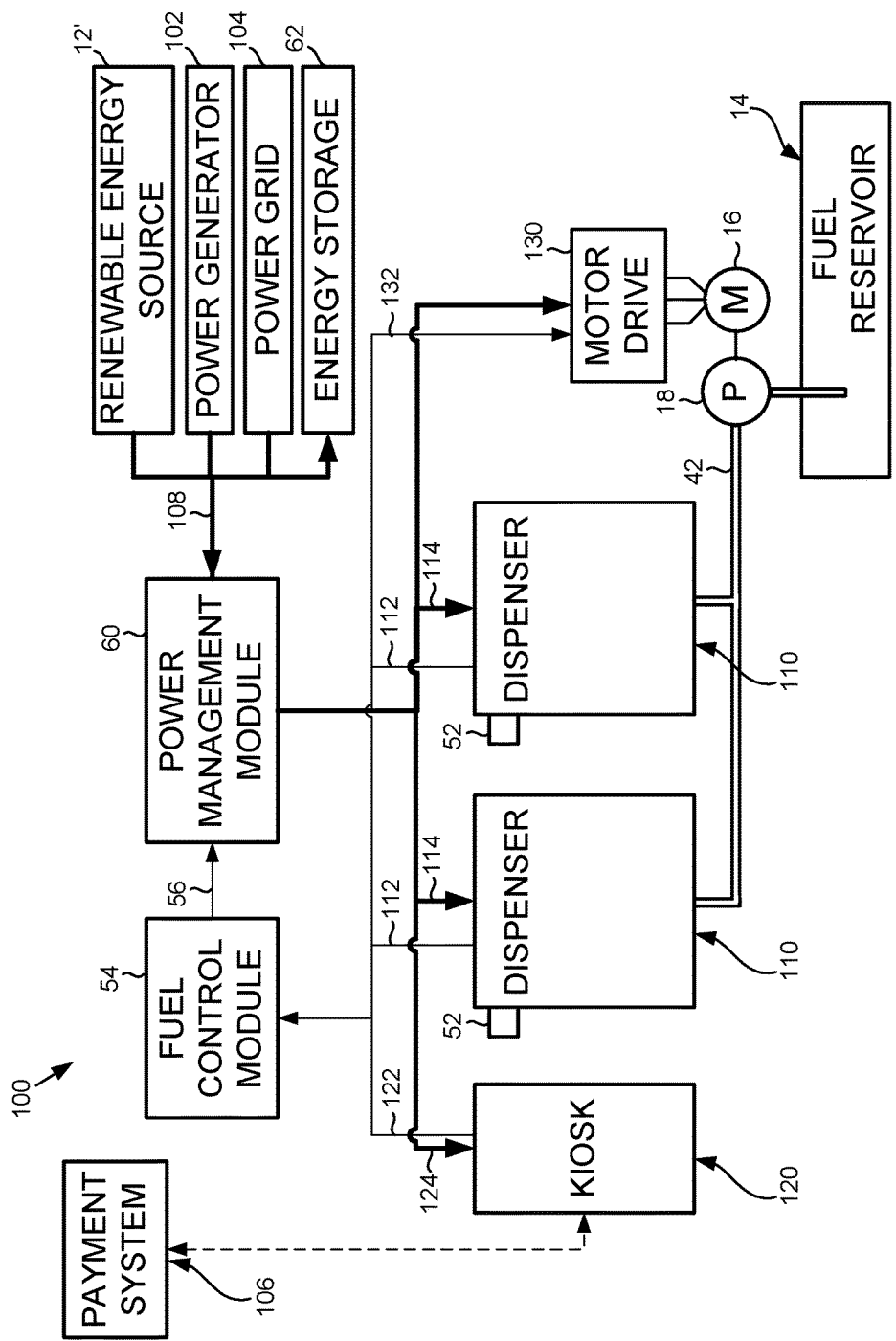
FIG. 9 is a schematic diagram of a yet further embodiment of a fueling system according with the invention and set forth in the disclosure.

FIG. 9 depicts a further embodiment of a solar fueling system, denoted by numeral 100, including a motor drive 130. Motor drive 130 may be a conventional variable speed drive receiving a speed command signal on a signal line 132 from power management module 60. Power management module 60 determines available natural energy and pumping demand, and thus may control the speed of motor drive 130 as described below with an appropriate speed command signal. In the present embodiment, power management module 60 includes MPPT module 22. Solar fueling system 100 is capable of operating two or more dispensers 110 and to use various energy sources including a natural energy source 12', a power generator 102 converting fuel into electrical energy, and a power grid 104. Natural energy source 12' refers to a device that converts natural energy to electrical energy and may comprise solar panels, wind generators, and hydroelectric turbines, for example. Electric energy generated by one or more of the energy sources is conveyed via power lines 108 to power management module 60, and from there to dispensers 110 and a kiosk 120 via power lines 114 and 124. Signal lines 112 between fuel control module 54 and dispensers 112 transmit enable signals and demand signals as described above. A signal line 56 enables communication between fuel control module 54 and power management module 60, for example to transmit a load signal to enable power management module 60 to switch from one energy source to others. Signal line 122 transmits POS information to fuel control module 54 to enable transactions as is known in the art. Kiosk 120 may communicate with payment system 106 to cause fuel control module 54 to enable fuel dispensing once payment has been made. Kiosk 120 may receive AC power from the energy sources to power lights, refrigeration equipment and POS logic. Inverters may be provided to convert DC power to AC power for use by kiosk 120, rectification circuits may be provided to convert AC power to DC power for use by motor drive 130, and switching devices may be provided to facilitate switching between energy sources as determined by the power management logic in power management module 60.

In one variation of the present embodiment, power management logic tracks electric energy demand and implements load switching logic to shed demand. Power management logic may monitor parameters of kiosk 120 and cycle power to electric energy consuming devices to maximize use of power from natural energy sources. In one example, fueling system 100 includes a leak detection system configured as is known in the art to monitor fuel leaks from fuel reservoir 14. The leak detection system, as the term is used herein, is an electric energy consuming device. In accordance with the present embodiment, power management logic operates the leak detection system during high insolation periods or when neither pump is pumping. Leak detection may comprise line leak detection and reservoir leak detection.

In another example, the power management logic changes ambient temperature setpoints to reduce air conditioning of kiosk 120 during peak periods of energy usage on the power grid, thereby reducing electric energy charges when electric energy charges are based on usage during peak periods. Additionally or alternatively, the power management logic may power the air conditioning system with energy from natural energy source 12' when pumping is not required. The power management logic may maintain the ambient temperature near the low limit of a temperature control range. When pumping is required, air conditioning is paused and the ambient temperature is permitted to rise toward the high limit of the temperature range. When pumping is complete, air conditioning resumes. The foregoing paragraph describes cycling of air conditioning to beneficially use natural energy when pumping is not required. Other energy consuming devices may comprise a refrigeration system, food heating systems, air compressors, and any other device other than the fuel pump which requires electrical energy to operate and does not need to be continuously operated. To the extent that an electrical energy consuming device is capable of operation and more than one speed, the power management logic may also be structured to control the speed of the electrical energy consuming device to shed load. For example, a two-stage compressor may be operated at one stage to shed demand and with both stages when demand shedding is not desired. Compressors may be comprised in air compression systems and liquid chilling systems, for example. Additional energy conservation means and mechanisms are described in commonly owned U.S. patent application Ser. No. 13/164,402, filed Jun. 20, 2011, which is incorporated herein by reference in its entirety.

In a variation of the present embodiment, electric motor 16 comprises a conventional single-speed motor and motor drive 130 comprises a conventional motor drive which may simply comprise a contactor with soft-start capability. Power management module 60 may thus engage motor drive 130 and cycle energy consuming devices as described in the preceding paragraph.

As indicated previously, motor drive 20 may operate at a first speed, at a second speed, and at speeds therebetween. Pumping to supply two dispensers simultaneously doubles the pumping demand, therefore the first speed in the present embodiment is sufficient to supply two or more dispensers simultaneously. There are times, however, when the extra pumping capacity is not needed and electric motor 16 can be operated at a reduced speed to consume less energy. Depending on the number of dispensers 110, the power management logic that tracks parameters of kiosk 120 and cycles power to energy consuming devices to maximize use of power from natural energy sources may determine that cycling of energy consuming devices is permissible not only when pumping is not required but also when pumping from only one pump, or only two pumps, or only a predetermined number of pumps, is required. Since fueling system 100 is sized to dispense from multiple dispensers, the power management logic can determine whether enough natural energy is available after accounting for operation of the required number of pumps to operate one or more energy consuming devices, and then operate the energy consuming devices accordingly. In the present context, energy storage 62 may also be cycled based on pumping requirements and demand from other energy consuming devices.

Motor drive 130 may be a conventional variable speed drive receiving a speed command signal on a signal line 132 from power management module 60. Power management module 60 determines available natural energy and pumping demand, and thus may control the speed of motor drive 130 as described below with an appropriate speed command signal. In the present embodiment, power management module 60 includes MPPT module 22.

Figure 10:
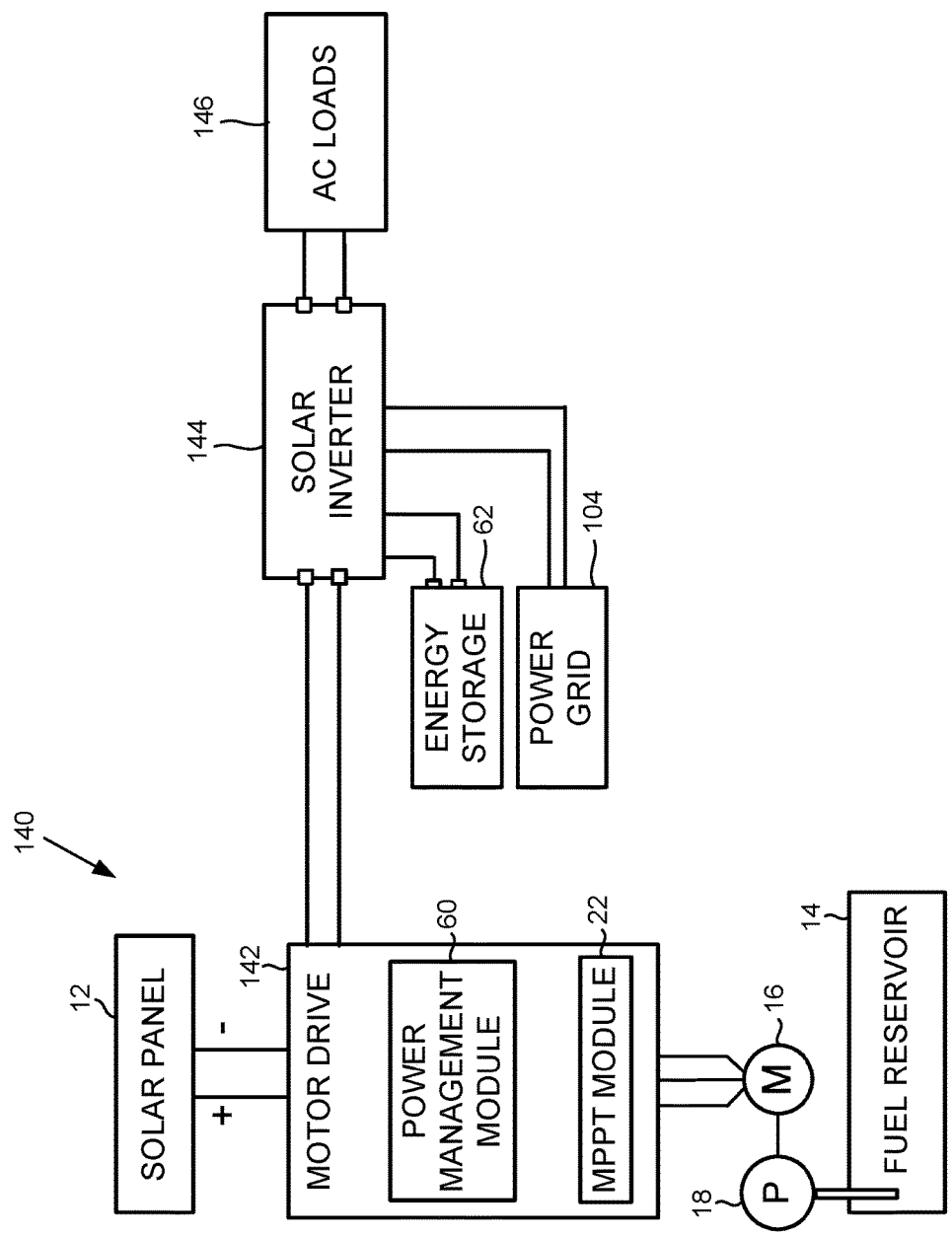
FIGS. 10 to 14 are schematic diagrams of additional fueling system embodiments of a according with the invention and set forth in the disclosure.

FIG. 10 depicts a further embodiment of a solar fueling system, denoted by numeral 140, including a motor drive 142. Motor drive 142 includes power management module 60, MPPT module 22, and power switches. Power management module 60 comprises power management logic configured to engage the power switches, for example a switch-mode converter, to divert excess power from solar panel 12 to a conventional solar inverter 144. Solar inverter 144 can then power any AC loads 146 connected to it, e.g. electric energy consuming devices. In this manner motor drive 142 prioritizes use of energy from solar panel 12 to power electric motor 16, diverts energy when excess solar energy is available, and may slow down electric motor 16 to the second speed when excess solar energy is only available at the second speed.

Figure 11:
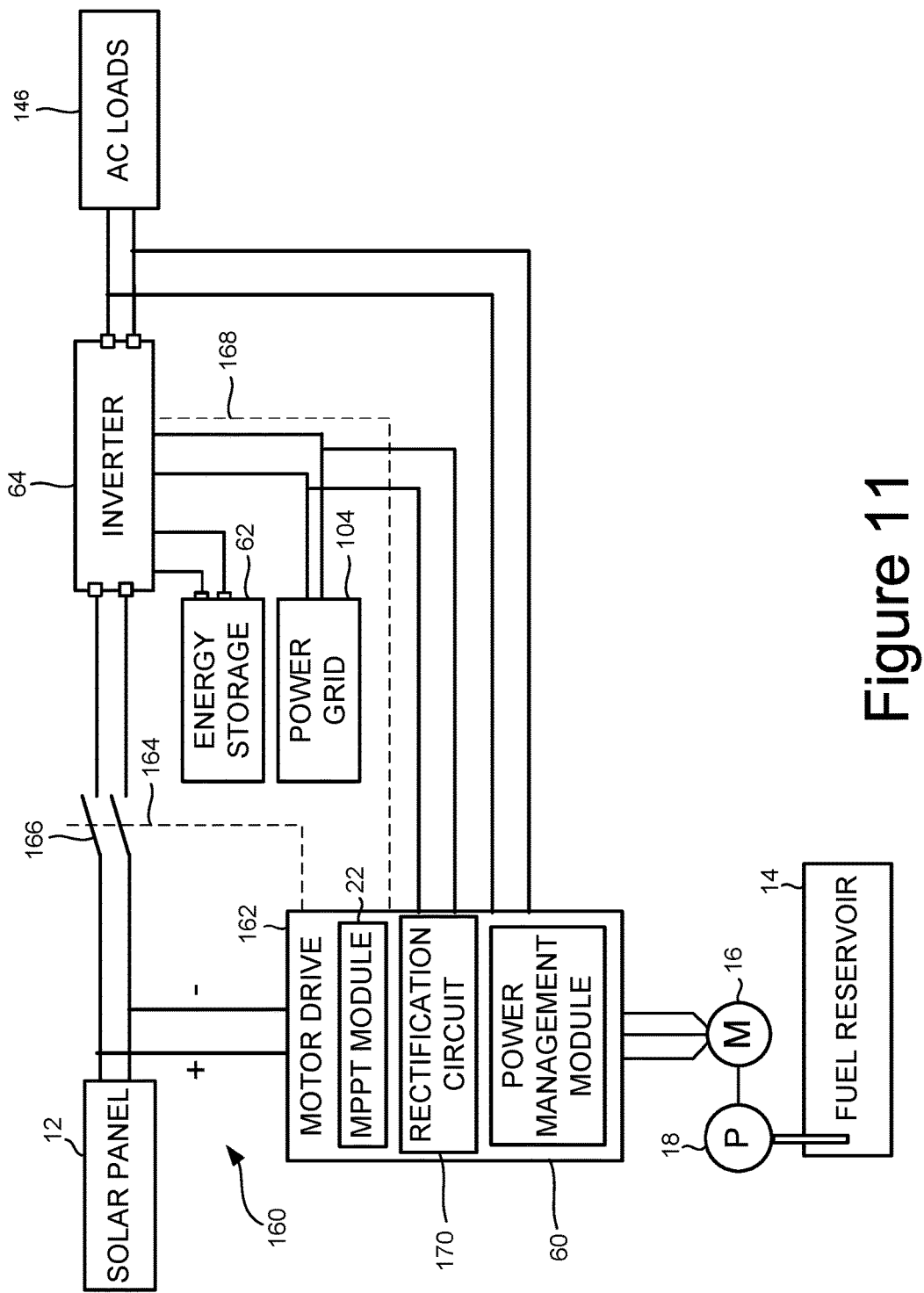

FIG. 11 depicts a yet further embodiment of a solar fueling system, denoted by numeral 160, including a motor drive 162. Motor drive 162 includes MPPT module 22, which includes MPPT logic configured to engage a power switch 166 via a power switching signal over a signal line 164 when pumping is not required. In this manner motor drive 162 prioritizes use of energy from solar panel 12 to power electric motor 16 and diverts the energy to inverter 64 otherwise. When disconnected from solar panel 12 by power switch 166, inverter 64 draws power from alternative sources, such as power grid 104.

Alternatively or additionally, MPPT module 22 may comprise logic configured to divert energy when excess solar energy is available, and to slow down electric motor 16 to the second speed when excess solar energy is only available at the second speed. To prevent MPPT control contention, wherein two devices attempt to control the electrical load to maximize power, inverter 64 is provided a contention prevention signal over signal line 168, through which motor drive 162 can throttle use of solar panel energy by inverter 64, and disabling MPPT logic in inverter 64, thus controlling the load seen by solar panel 12. Throttling may be accomplished by drawing energy from power grid 104 or energy storage 62 to complement solar panel energy in an amount determined based on the contention prevention signal. For example, MPPT module 22 may determine that X watts of power can be diverted, and inverter 64 may determine that Y watts of power are demanded, thus draw Z watts of power, Z=Y−X, from power grid 104 or energy storage 62 are drawn. When motor drive 162 is not required to pump, inverter 64 may operate in accordance with its own MPPT logic, and may charge energy storage 62 or draw energy from power grid 104 in any manner known in the art.

In a variation of the present embodiment, AC power may be drawn by motor drive 162 from inverter 64 during low insolation levels. In the present variation, motor drive 162 comprises a rectification circuit 170 to convert the AC power to DC power. In an aspect of the present variation, motor drive 162 draws AC power when energy from energy storage 62 is inaccessible. When energy from energy storage 62 is accessible, motor drive 162 may draw power form energy storage 62. In this context, energy from energy storage 62 is accessible when sufficient energy is available to satisfy demand from AC loads 146 and motor drive 162. Alternatively, sufficient energy may be made available by switching electric energy consuming devices to reduce AC load 146 demand, and by slowing down motor drive 162. Power management module 60 and inverter 64 may communicate load information and switching instructions using the contention prevention signal.

Figure 12:
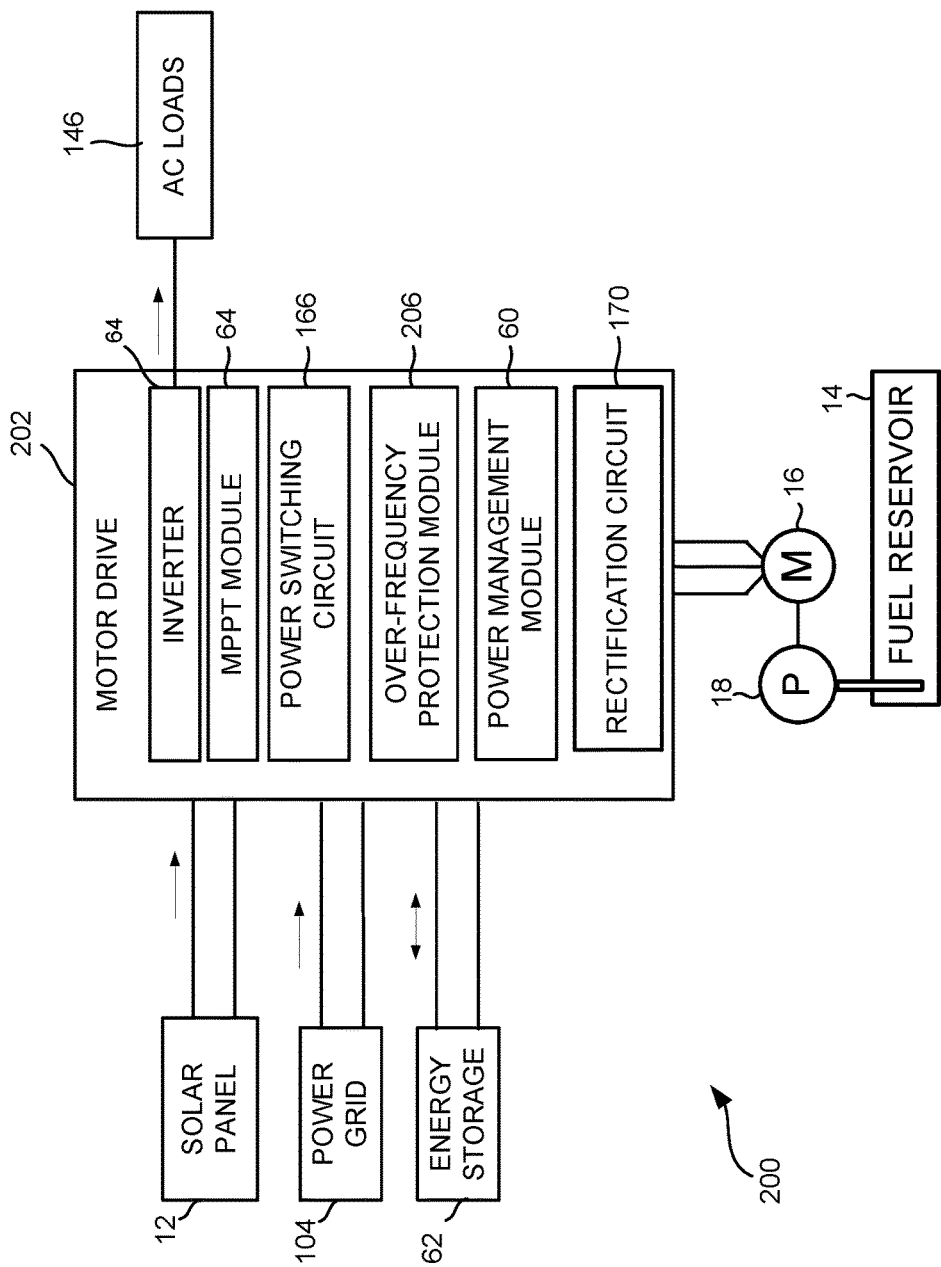

FIG. 12 depicts another embodiment of a solar fueling system, denoted by numeral 200, comprising an integrated motor drive 202. Motor drive 202 includes MPPT module 22, power management module 60, power switch 166, and an over-frequency protection module 206. Power switch 166 may comprise a 2-pole multiple position rotary switch to switch energy sources in accordance with instructions from power management module 60. Power management module 60 includes power management logic described above that determines availability of excess solar energy when pumping is required, diverts the excess energy to inverter 64, and draws from power grid 104 or energy storage 62 when solar energy is not sufficiently available. The over-frequency protection module is a module specifically provided to limit the speed of the pump to prevent over-pressurizing the fuel.

Figure 13:
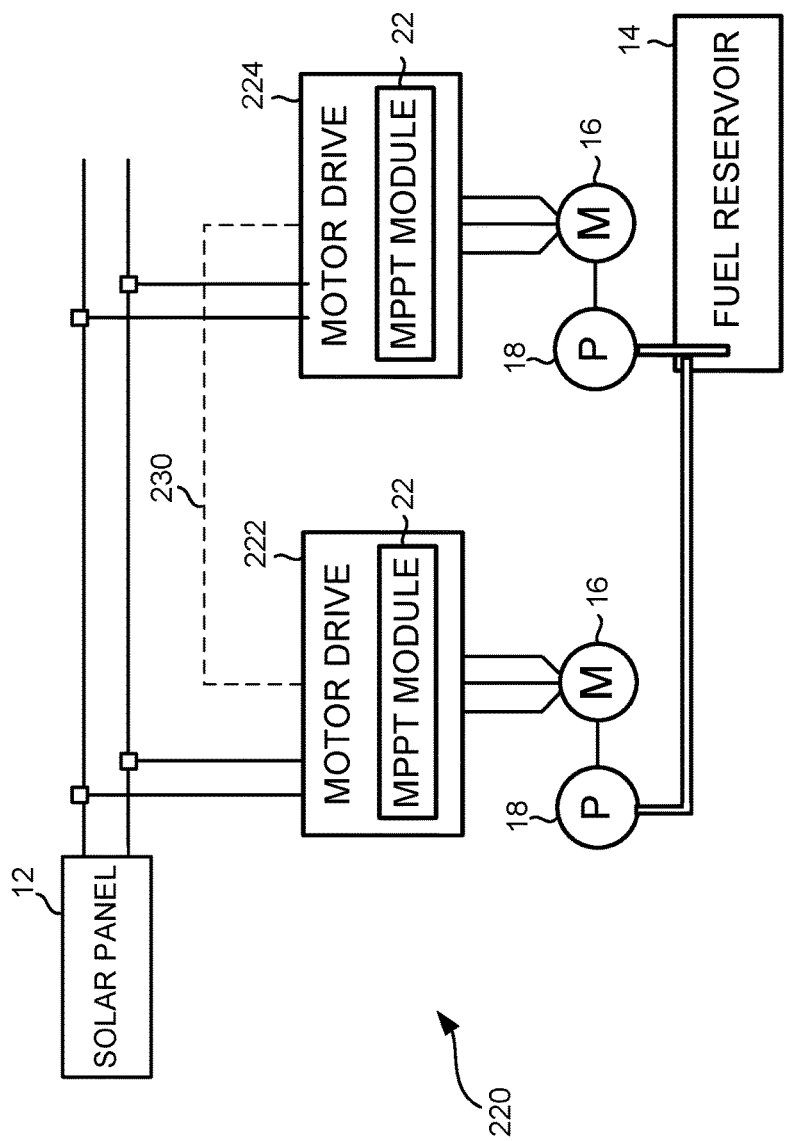

FIG. 13 depicts another embodiment of a solar fueling system, denoted by numeral 220, comprising a motor drive 222 and a motor drive 224. A contention prevention signal over a signal line 230 enables motor drive 222 to set the speed of motor drive 224, or vice versa, so that only one MMPT module 22 evaluates the availability of solar energy and sets the speeds of both pumps. One of the motor drives operates when pumping from one dispenser is required, and both may operate if more than one dispenser is in operation. One of the drives may be coupled to a source of AC power when sufficient solar energy is not available. Solar fueling system 220 may also comprise a leak detection system, described above, and power management logic to perform demand shedding as described above.

Figure 14:
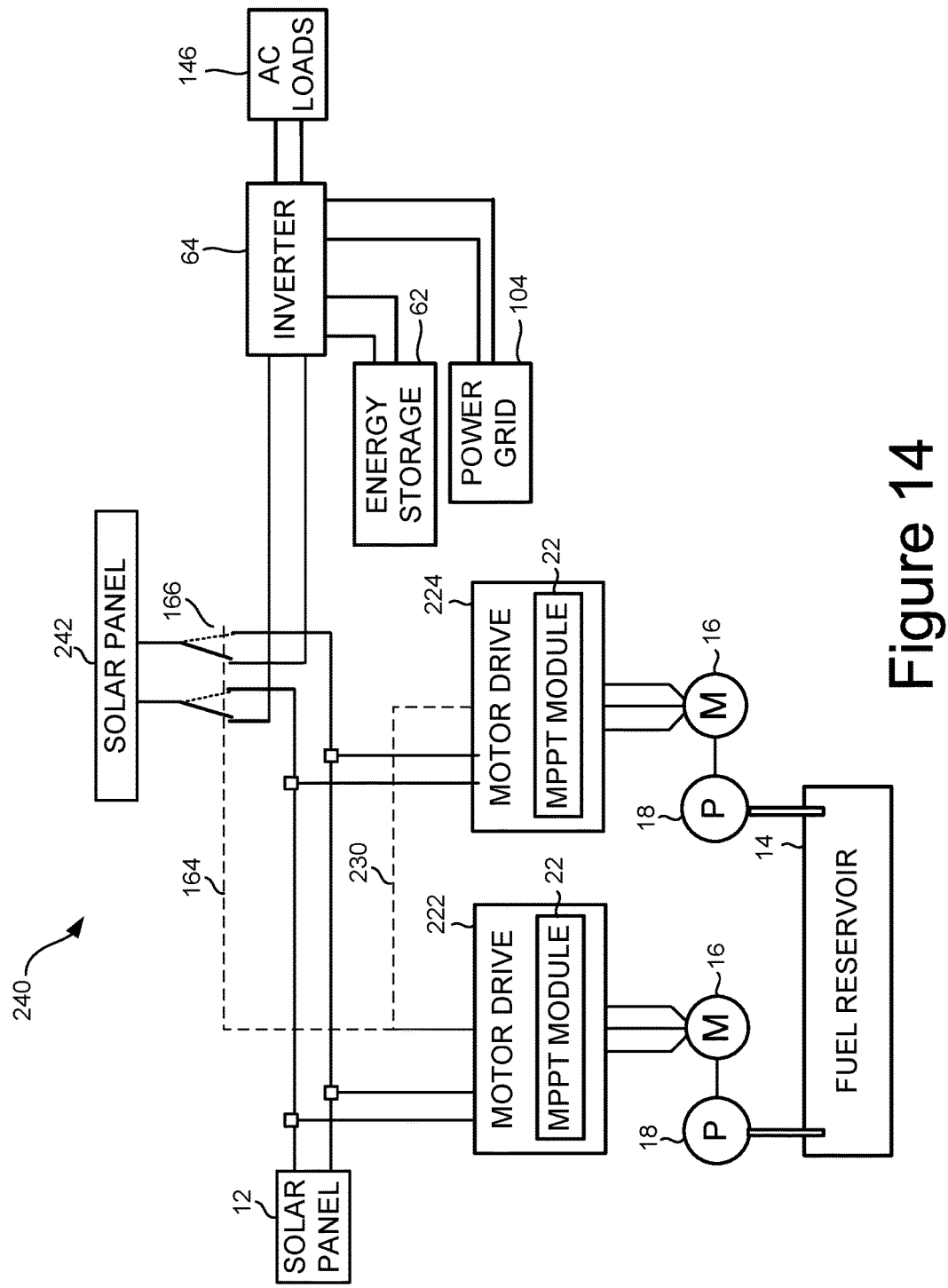

FIG. 14 depicts another embodiment of a solar fueling system, denoted by numeral 240, which comprises the components of fueling system 220 and, additionally, a solar panel 242. A switching signal over signal line 164 disconnects solar panel 242 from the motor drives and connects it to inverter 64 when pumping is not required or can be satisfied by motor drive 222. When higher flows are needed, requiring both motor drives, a contention prevention signal over signal line 230 enables motor drive 222 to set the speed of motor drive 224, so that only one MMPT module 22 evaluates the availability of solar energy and sets the speeds of both pumps. One of the drives may be coupled to an alternate energy source when sufficient solar energy is not available, as disclosed with reference to FIG. 11. Solar fueling system 220 may also comprise a leak detection system, described above, and power management logic to perform demand shedding as described above. In the present embodiment, the fueling system may operate with one drive most of the time and the inverter is powered by solar energy most of the time, without control contention, and the inverter is supplied by alternate sources during high pumping requirements, when both motor drives are needed to satisfy demand. Power management logic may regulate the speeds of the pumps, as discussed previously, to extend operation of the pumps with solar energy. In a variation of the present embodiment, only solar panel 242 is provided and one or more motor drives are provided, and the motor drive (or one of them) controls switching of power switch 166 as discussed here to prevent control contention between the motor drive and the inverter. The solar panel thus fuels the motor drive or the inverter, without control contention, and the inverter is supplied by alternate sources when pumping is required.

As used herein, processing instructions include a single application, a plurality of applications, one or more programs or subroutines, software, firmware, and any variations thereof suitable to execute instruction sequences with a processing device.

As used herein, a processing or computing system or device may be a specifically constructed apparatus or may comprise general purpose computers selectively activated or reconfigured by software programs or processing instructions stored therein. The computing device, whether specifically constructed or general purpose, has at least one processing device, or processor, for executing processing instructions and computer readable storage media, or memory, for storing instructions and other information. Many combinations of processing circuitry and information storing equipment are known by those of ordinary skill in these arts. A processor may be a microprocessor, a digital signal processor (DSP), a central processing unit (CPU), or other circuit or equivalent capable of implementing instructions or performing logical actions on information. A processor encompasses multiple processors integrated in a motherboard and may also include one or more graphics processors and embedded memory. Exemplary processing systems include workstations, personal computers, portable computers, portable wireless devices, mobile devices, and any device including a processor, memory and software. Processing systems also encompass one or more computing devices and include computer networks and distributed computing devices.

As used herein, a non-transitory machine readable storage medium comprises any medium configured to store data, such as volatile and non-volatile memory, temporary and cache memory and optical or magnetic disk storage. Exemplary storage media include electronic, magnetic, optical, printed, or media, in any format, used to store information. Computer readable storage medium also comprises a plurality thereof.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component. Therefore, the term "memory device" includes any variation of electronic circuits in which processing instructions executable by a processing device may be embedded unless otherwise expressly stated in connection with the specific use of the term. For example, a memory device includes read only memory, random access memory, a field programmable gate array, a hard-drive, a disk, flash memory, and any combinations thereof, whether physically or electronically coupled. Similarly, a processing device includes, for example, a central processing unit, a math processing unit, a plurality of processors on a common integrated circuit, and a plurality of processors operating in concert, whether physically or electronically coupled. Furthermore and in a similar manner, the term "application" includes a single application, a plurality of applications, one or more programs or subroutines, software, firmware, and any variations thereof suitable to execute instruction sequences with a processing device. Furthermore and in a similar manner, the term "unit" denotes a functional unit and the term includes a single unit, a plurality of units, and one or more components arranged in a common enclosure or in a distributed manner.

Embodiments disclosed above provide economic and environmental benefits by reducing the amount of power needed to pump fuel using energy sources other than solar energy to a greater extent than previously possible. The features disclosed above include speed control to maximize photovoltaic conversion, and load shedding, including speed reduction and scheduling of leak detection. Additionally, techniques were provided for avoiding control contention between motor drives and inverters that draw energy from common solar panels. These features can be implemented individually or in any combination suitable to the size, location, and fueling demands of a fueling station under consideration. Although the invention has been described with reference to solar panels, the attendant features and benefits also applicable to renewable energy harvesting devices, which convert renewable energy to electrical energy. Example renewable energy devices include solar panels, wind generators, and hydroelectric turbines. Of course, wind generators and hydroelectric turbines can be made to produce AC power, and may require additional rectification circuits to provide DC power to the energy storage or the motor drive.

The following examples pertain to further embodiments:

In one example, a pumping system comprises: a solar panel performing a photovoltaic conversion based on an insolation level including a first insolation level and a second insolation level; a fuel reservoir containing a fuel in a liquid state; an electric motor; a pump rotatable by the electric motor to pump the fuel; and a first motor drive converting electrical energy supplied by the solar panel to drive the electric motor at a first speed at the first insolation level and at a second speed, slower than the first speed, at the second insolation level, thereby pumping the fuel at a first rate and a second rate, respectively.

In another example, the pumping system of example 1, further comprising a fueling nozzle fluidly coupled to the fuel reservoir to discharge the fuel and a fueling switch configured to transmit an enable command.

In another example, the pumping system of example 2, further comprising fueling control logic, and a point-of-sale (POS) module configured to transmit an indication of payment, the fueling control logic configured to generate a fueling control signal responsive to receipt of the enable command and the indication of payment, the fueling control signal causing the first motor drive to drive the electric motor.

In another example, the pumping system of example 1, wherein the first motor drive comprises a variable speed drive configured to drive the electric motor at a variable speed based on the insolation level when the insolation level is between the first insolation level and the second insolation level. In a variation thereof, the pumping system further comprises a maximum power point (MPPT) module structured to configure the variable speed to maximize the photovoltaic conversion. In a further variation of the present example, the MPPT module is configured to sense a substantially open-circuit voltage of the solar panel when pumping is not required and to base the variable speed on the substantially open-circuit voltage.

In another example, the pumping system of example 1, further comprising an energy storage and a power management module configured to charge the energy storage when the pump is not pumping. In a variation thereof, the first motor drive comprises a variable speed drive configured to drive the electric motor at a variable speed, and the power management module is further configured to energize the first motor drive using the energy storage when the insolation level is less than the low insolation level. In a further variation of the present example, the power management module is further structured to configure the variable speed based on a state-of-charge of the energy storage.

In another example, the pumping system of claim 1, further comprising an energy storage, a power management module, and a power switch, the power management module configured to charge the energy storage when the pump is not pumping and to energize the first motor drive when the solar insolation is below the first insolation level. In a variation thereof, the power management module is configured to operate the electrical motor at a reduced speed during grid power peak demand periods.

In another example, the pumping system of claim 1, further comprising: a second pump fluidly coupled to the fuel reservoir; a second electric motor; a second motor drive electrically coupled to a second power source and operable to drive the second electric motor to pump the fuel, the second power source comprising at least one of a power grid and an energy storage; and fueling control logic configured to: generate a first control signal to cause the first motor drive to drive the first motor; detect a low performance level of the system; responsive to the detection of the low performance level, generate a second control signal to cause the second motor drive to drive the second motor.

In another example, the pumping system of claim 1, further comprising: a second pump fluidly coupled to the fuel reservoir; a second electric motor; a second motor drive electrically coupled to a second power source and operable to drive the second electric motor to pump the fuel, the second power source comprising at least one of a power grid and an energy storage; and fueling control logic configured to pump fuel by operating the first motor drive until performance of the pumping system is equal to or less than a low performance level, the low performance level being greater than a minimum performance level, and then operating the second motor drive to supplement fuel pumping. In a variation thereof, the fueling control logic further configured to stop operating the first motor drive when the insolation level is below the second insolation level. In a further variation of the present example, the low performance level comprises at least one of a low fuel pressure, a low flow rate, a low power, a low DC-link voltage, and an insolation level equal to or less than a third insolation level which is between the first insolation level and the second insolation level.

In another example, the pumping system of claim 1, further comprising: a second pump fluidly coupled to the fuel reservoir; a second electric motor; a second motor drive electrically coupled to a second power source and operable to drive the second electric motor to pump the fuel, the second power source comprising at least one of a power grid and an energy storage; and fueling control logic configured to detect peak operating hours by monitoring a schedule, and to operate one or both of the first motor drive and the second drive during peak operating hours to pump fuel at a maximum flow rate. In a variation thereof, the fueling control logic is further configured to detect a fourth insolation level and to operate the second motor drive at a maximum speed responsive to the insolation level being equal to or below the fourth insolation level.

In another example, a method of operating a pumping system comprises: driving an electric motor at a first speed when an insolation level of a solar panel supplying energy for the electric motor is at or above a first insolation level; driving the electric motor at a second speed, lower than the first speed, when the insolation level is at a second insolation level; and pumping a fuel with a pump rotated by the electric motor at a first rate and a second rate corresponding, respectively, to the first speed and the second speed. In a variation thereof, the method further comprises driving the electric motor at a variable speed based on the insolation level when the insolation level is between the first insolation level and the second insolation level. In another variation thereof, the method further comprises maximum power point controlling the first motor drive to drive the electric motor at a speed configured to maximize a photovoltaic conversion of the solar panel. In a further variation of the present example, maximum power point controlling the first motor drive comprises sensing a substantially open-circuit voltage of the solar panel while pumping is not required, and basing the speed on the substantially open-circuit voltage.

In another example, a method of operating a pumping system comprises: driving an electric motor at a first speed when an insolation level of a solar panel supplying energy for the electric motor is at or above a first insolation level; driving the electric motor at a second speed, lower than the first speed, when the insolation level is at a second insolation level; and pumping a fuel with a pump rotated by the electric motor at a first rate and a second rate corresponding, respectively, to the first speed and the second speed, and the method further comprises charging an energy storage with the energy from the solar panel when the pump is not pumping. In a variation thereof, the method further comprises energizing the first motor drive with the energy storage when the insolation level is less than the first insolation level. In a further variation of the present example, the method further comprises, when the insolation level is less than the first insolation level, driving the electric motor at a speed based on a state-of-charge of the energy storage In another example, a method of operating a pumping system as described in the preceding examples further comprises energizing the first motor drive with the solar panel and a second solar panel to pump fuel, and connecting the second solar panel to an inverter when pumping is not required while also disconnecting the second solar panel from the first motor drive.

In another example, a method of operating a pumping system as described in the preceding examples further comprises energizing the first motor drive and a second first motor drive with the solar panel to pump fuel, and maximum power point controlling the first motor drive and the second first motor drive by the first motor drive determining a speed of the first motor drive and a speed of the second first motor drive, and the first motor drive communicating the speed of the second first motor drive to the second first motor drive.

In another example, a method of operating a pumping system as described in the preceding examples further comprises utilizing, by the pumping system, power management logic configured to monitor electric energy consuming devices generating in aggregate an energy demand, and selectively controlling one or more of the electric energy consuming devices to shed a portion of the energy demand. In a variation thereof, selectively controlling comprises shedding the portion of the energy demand when pumping the fuel with the pump. In a further variation of the present example, shedding the portion of the energy demand comprises operating the pump a speed lower than without shedding. In a further variation of the present example, selectively controlling comprises shedding the portion of the energy demand when the insolation level is at the second insolation level. In a further variation of the present example, selectively controlling comprises shedding the portion of the energy demand during a power grid peak demand period In one example, a pumping system comprises: a solar panel performing a photovoltaic conversion based on an insolation level including a first insolation level and a second insolation level; a fuel dispenser; a fuel reservoir containing a fuel in a liquid state; a first pump-motor assembly comprising a first electric motor, a first pump rotatable by the first electric motor to pump the fuel, and a first motor drive, the first pump-motor assembly configured to receive electrical energy generated by the solar panel; a second pump-motor assembly comprising a second electric motor, a second pump rotatable by the second electric motor to pump the fuel, and a second motor drive, the second pump-motor assembly configured to receive electrical energy from a line source; a fuel manifold fluidly coupling the first pump, the second pump, and the fuel dispenser; and fueling control logic configured to operate the second pump-motor assembly and not the first pump-motor assembly when the insolation level is below the second insolation level and to operate the first pump-motor assembly when the insolation level is above the second insolation level. In a variation thereof, the first motor drive comprises the fueling control logic, and the fueling control logic is configured to control the second motor drive. In a further variation of the present example, at least one of the first motor drive and the second motor drive is configured to operate, respectively, the first motor and the second motor at a single speed. In a further variation of the present example, at least one of the first motor drive and the second motor drive is configured to operate, respectively, the first motor and the second motor at a speed selected from a range of speeds.

In one example, a pumping system comprises an energy storage and a power management module configured to charge the energy storage when the first pump is not pumping and to energize the first motor drive with the energy storage when a solar insolation is below an insolation level sufficient for the first motor drive to drive the first electric motor at the second speed and pumping is required, wherein the second speed is the lowest speed at which the motor is to be operated.

While this invention has been described as having designs illustrated by embodiments and examples, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A pumping system comprising:
   a solar panel performing a photovoltaic conversion based on an insolation level including a first insolation level and a second insolation level;
   a fuel reservoir containing a fuel in a liquid state;
   a first electric motor;
   a first pump rotatable by the first electric motor to pump the fuel; and
   a first motor drive converting electrical energy supplied by the solar panel, the first motor drive configured to:
      drive the first electric motor at a first speed when the isolation level is at and above the first insolation level without exceeding the first speed if the insolation level exceeds the first insolation level; and
      drive the first electric motor at a second speed, slower than the first speed, when the isolation level is at the second insolation level, thereby pumping the fuel with the first pump at a first rate and a second rate corresponding, respectively, to the first speed and the second speed.

2. The pumping system of claim 1, wherein the first speed is the highest speed at which the first electric motor is to be operated and the second speed is the lowest speed at which the motor is to be operated.

3. The pumping system of claim 1, wherein the first motor drive comprises a variable speed drive configured to drive the first electric motor at a variable speed based on the insolation level when the insolation level is between the first insolation level and the second insolation level.

4. The pumping system of claim 3, further comprising a maximum power point (MPPT) module structured to configure the variable speed to increase the power output of the solar panel, wherein the MPPT module is configured to sense a substantially open-circuit voltage of the solar panel when pumping is not required and to base the variable speed on the substantially open-circuit voltage.

5. The pumping system of claim 1, further comprising an energy storage and a power management module configured to charge the energy storage when the first pump is not pumping and to energize the first motor drive with the energy storage when the solar insolation is below an insolation level sufficient for the first motor drive to drive the first electric motor at the second speed and pumping is required, wherein the second speed is the lowest speed at which the motor is to be operated.

6. The pumping system of claim 5, wherein the power management module is configured to cause the electrical motor to operate at a reduced speed during grid power peak demand periods.

7. The pumping system of claim 1, further comprising a second pump fluidly coupled to the fuel reservoir; a second electric motor; and a second motor drive powered by a non-renewable source and operable to drive the second electric motor to pump the fuel.

8. The pumping system of claim 7, further comprising fueling control logic configured to detect a low performance level of the system and, responsive to the detection of the low performance level, cause the second motor drive to drive the second motor.

9. The pumping system of claim 7, further comprising fueling control logic configured to operate the first motor drive until performance of the pumping system is equal to or less than a low performance level, and then operating the second motor drive to supplement fuel pumping.

10. A pumping system comprising:
    a solar panel performing a photovoltaic conversion based on an insolation level including a first insolation level and a second insolation level;
    a fuel reservoir containing a fuel in a liquid state;
    a first electric motor;
    a first pump rotatable by the first electric motor to pump the fuel;
    a first motor drive operable to convert electrical energy supplied by the solar panel to drive the first electric motor and cause the first pump to pump the fuel;
    a second pump fluidly coupled to the fuel reservoir;
    a second electric motor; and
    a second motor drive powered by a non-renewable source or an energy storage and operable, when performance of the pumping system is equal to or less than a low performance level, to concurrently drive the second electric motor to cause the second pump to pump the fuel.

11. The pumping system of claim 10, further comprising fueling control logic configured to detect the low performance level of the pumping system and, responsive to the detection of the low performance level, cause the second motor drive to drive the second motor.

12. The pumping system of claim 10, further comprising fueling control logic configured to operate only the first motor drive until performance of the pumping system is equal to or less than the low performance level.

13. The pumping system of claim 10, wherein the low performance level is greater than a minimum performance level.

14. The pumping system of claim 12, wherein the second insolation level is sufficient for the first motor drive to drive the first electric motor at the lowest speed at which the motor is to be operated and not at a substantially higher speed.

15. The pumping system of claim 12, wherein the first insolation level is sufficient for the first motor drive to drive the first electric motor at the highest speed at which the motor is to be operated.

16. The pumping system of claim 10, further comprising fueling control logic configured to detect peak operating hours by monitoring a schedule, and to operate one or both of the first motor drive and the second drive during peak operating hours to pump fuel at a maximum flow rate.

17. A method of operating a pumping system, the method comprising:
    driving a first electric motor at a first speed when an insolation level of a solar panel supplying energy for the first electric motor is at and above a first insolation level without exceeding the first speed if the insolation level exceeds the first insolation level;
    driving the first electric motor at a second speed, lower than the first speed, when the insolation level is at a second insolation level, lower than the first insolation level; and
    pumping a fuel with a first pump rotated by the first electric motor at a first rate and a second rate corresponding, respectively, to the first speed and the second speed.

18. The method of claim 17, further comprising energizing the first motor drive with the solar panel and a second solar panel to pump the fuel, and connecting the second solar panel to an inverter to power the inverter with electric energy from the second solar panel when pumping is not required while also disconnecting the second solar panel from the first motor drive.

19. The method of claim 17, further comprising monitoring an energy demand from electric energy consuming devices including the first motor drive, and shedding a portion of the energy demand when pumping the fuel with the first pump.

20. The method of claim 19, wherein said shedding comprises operating the first pump at a speed lower than without said shedding when the isolation level is below the first insolation level.

21. The method of claim 19, wherein said shedding comprises reducing, during a power grid peak demand period, the energy demand from the electric energy consuming devices except motor drives, said motor drives including the first motor drive.

22. The method of claim 17, further comprising maximum power point controlling the first motor drive to drive the first electric motor at the first speed configured to maximize the power output of the solar panel, and further comprising energizing a second motor drive with a non-renewable energy source to drive a second pump at the second speed based on the first speed, to supplement pumping by the first pump.

23. A method of operating a pumping system, the method comprising:
    supplying energy from a solar panel to a first motor drive to drive a first electric motor and a first pump to pump fuel from a fuel reservoir; and
    when performance of the pumping system is equal to or less than a low performance level, concurrently supplying energy from a non-renewable source or an energy storage to a second motor drive to drive a second electric motor and a second pump to supplement pumping of the fuel from the fuel reservoir.

24. The method of claim 23, further comprising operating only the first motor drive until performance of the pumping system is equal to or less than the low performance level.

25. The method of claim 23, further comprising detecting peak operating hours by monitoring a schedule, and operating one or both of the first motor drive and the second drive during the peak operating hours to pump the fuel at a maximum flow rate.

26. The method of claim 25, further comprising operating the second motor drive for a predetermined time before the peak operating hours.

27. The method of claim 23, further comprising operating the second motor drive at a speed inversely proportional to an insolation level, wherein the speed approaches a highest speed at which the second electric motor is to be operated as the insolation level falls below a level sufficient to operate the first motor drive.

28. The method of claim 23, further comprising:
    operating the second motor drive and not the first motor drive when an insolation level is below a level sufficient to operate the first motor drive; and
    operating the first motor drive and not the second motor drive when the insolation level is above the level sufficient to operate the first motor drive.

* * * * *